(12) United States Patent
Höller

(10) Patent No.: US 12,268,126 B2
(45) Date of Patent: Apr. 8, 2025

(54) EAR LIFTER FOR CROPS

(71) Applicant: SMF—HOLDING GMBH, Eichelhardt (DE)

(72) Inventor: Frank Höller, Stein Wingert (DE)

(73) Assignee: SMF—HOLDING GMBH, Eichelhardt (DE)

(*) Notice: Subject to any disclaimer, the term of this patent is extended or adjusted under 35 U.S.C. 154(b) by 730 days.

(21) Appl. No.: 17/607,460

(22) PCT Filed: Apr. 20, 2020

(86) PCT No.: PCT/EP2020/060958
§ 371 (c)(1),
(2) Date: Oct. 29, 2021

(87) PCT Pub. No.: WO2020/221609
PCT Pub. Date: Nov. 5, 2020

(65) Prior Publication Data
US 2022/0201935 A1    Jun. 30, 2022

(30) Foreign Application Priority Data

Apr. 30, 2019  (EP) .................................... 19172022

(51) Int. Cl.
*A01D 65/02* (2006.01)
*A01D 45/02* (2006.01)

(52) U.S. Cl.
CPC ........... *A01D 45/021* (2013.01); *A01D 65/02* (2013.01)

(58) Field of Classification Search
CPC ....... A01D 45/021; A01D 65/00; A01D 65/02
See application file for complete search history.

(56) References Cited

U.S. PATENT DOCUMENTS

| 737,028 | A | * | 8/1903 | Seidl | A01D 65/02 |
|---|---|---|---|---|---|
| 2,576,122 | A | * | 11/1951 | Kenison | A01D 65/02 |
| | | | | | 56/312 |
| 2,734,332 | A | * | 2/1956 | Fisher | A01D 65/02 |
| | | | | | 56/314 |
| 2019/0053431 | A1 | | 2/2019 | Gaterman | |

FOREIGN PATENT DOCUMENTS

| DE | 33 00 769 A1 | 7/1984 |
|---|---|---|
| DE | 21 2014 000 204 U1 | 5/2016 |
| EP | 1 256 271 A1 | 11/2002 |

OTHER PUBLICATIONS

International Search Report of PCT/EP2020/060958 dated Jul. 8, 2020 [PCT/ISA/210].

* cited by examiner

*Primary Examiner* — Thomas B Will
*Assistant Examiner* — Robert E Pezzuto
(74) *Attorney, Agent, or Firm* — Sughrue Mion, PLLC

(57) ABSTRACT

Ear lifter for crops having a support bar, wherein the support bar extends in a major direction of extension and has a fastening portion, a middle portion and a skid portion arranged one after the other in the major direction of extension.

11 Claims, 17 Drawing Sheets

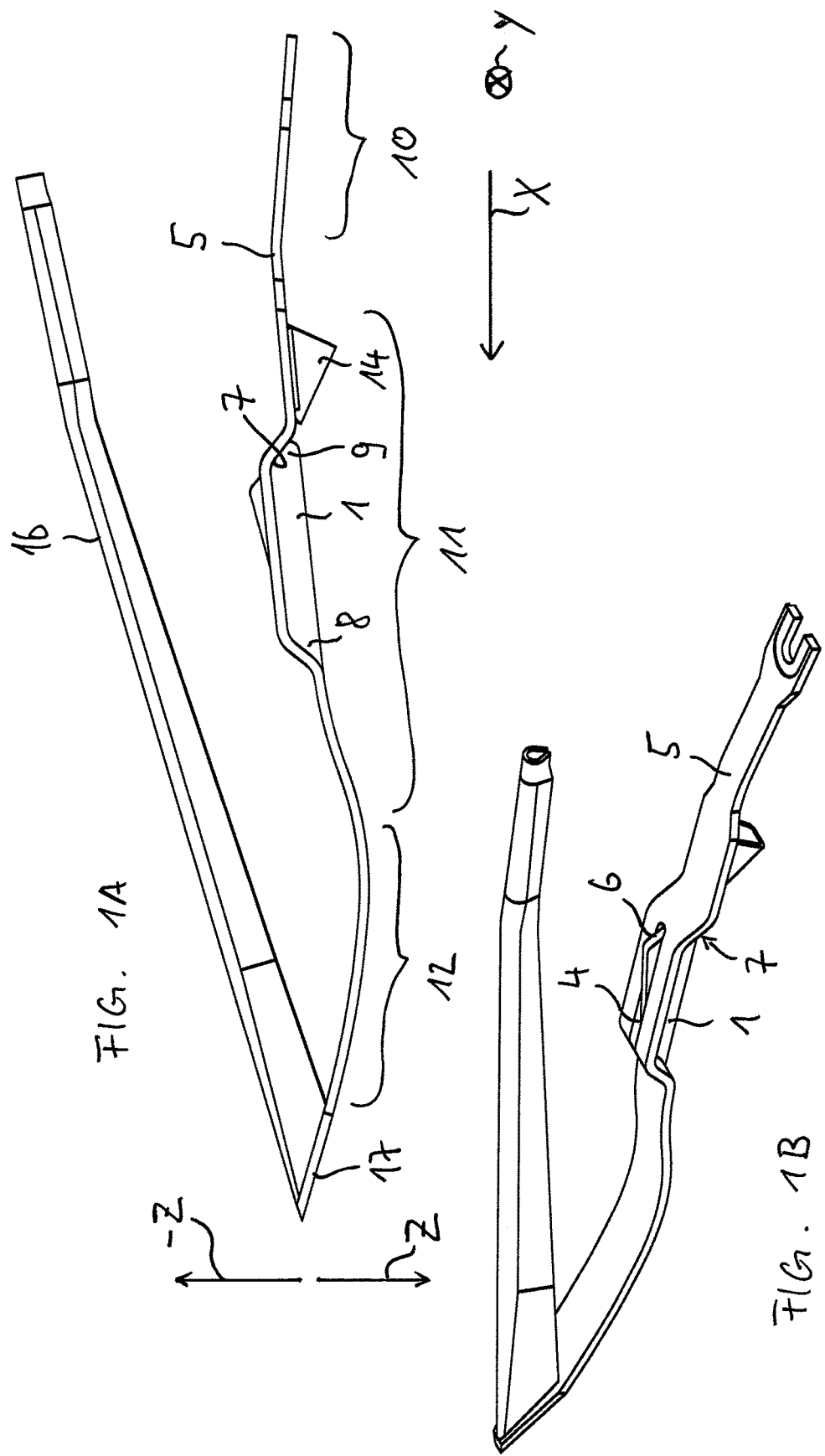

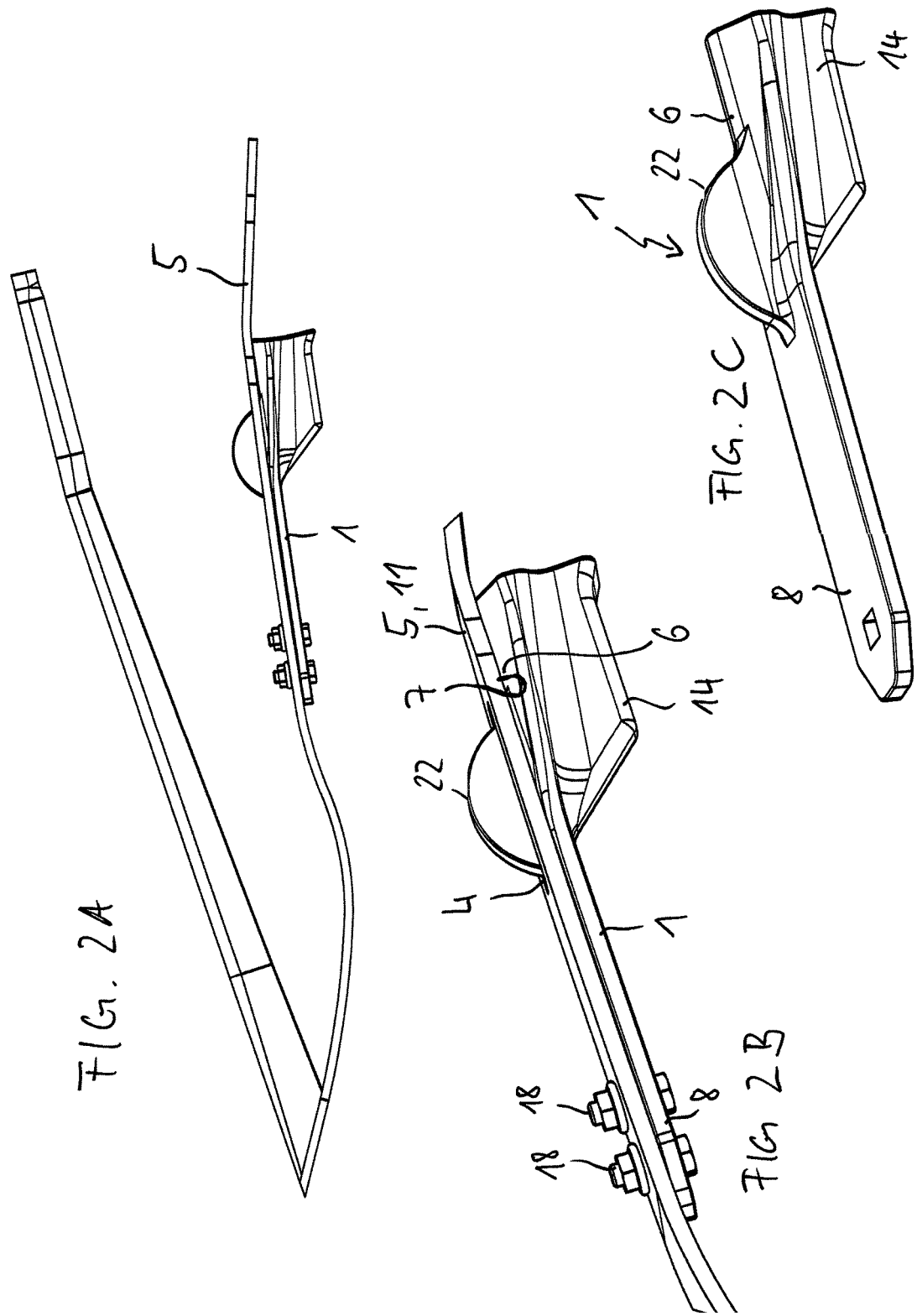

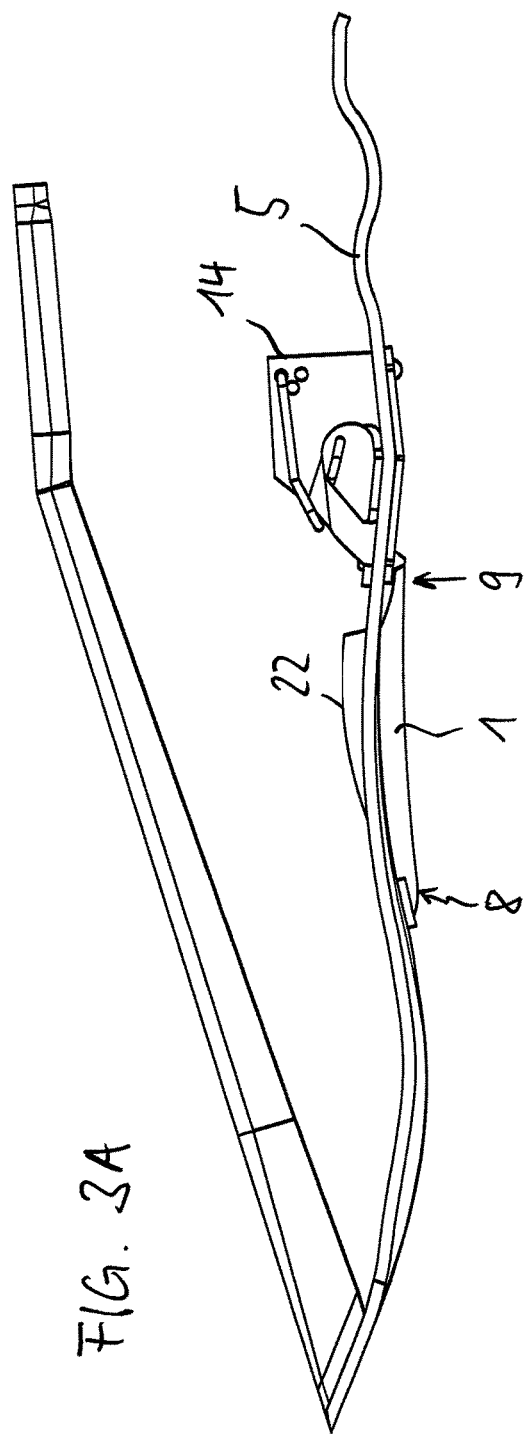
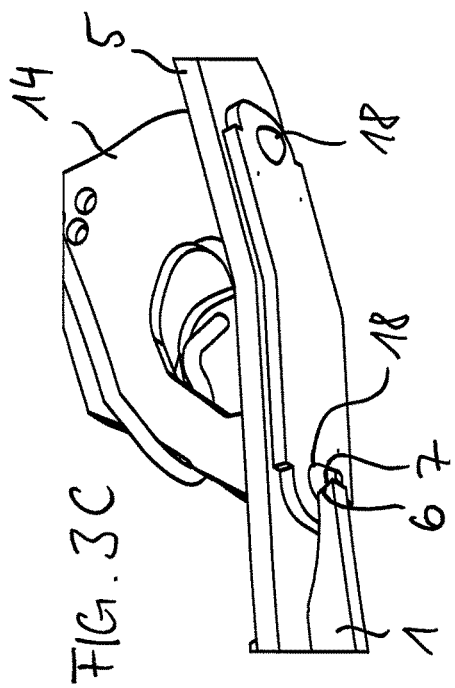
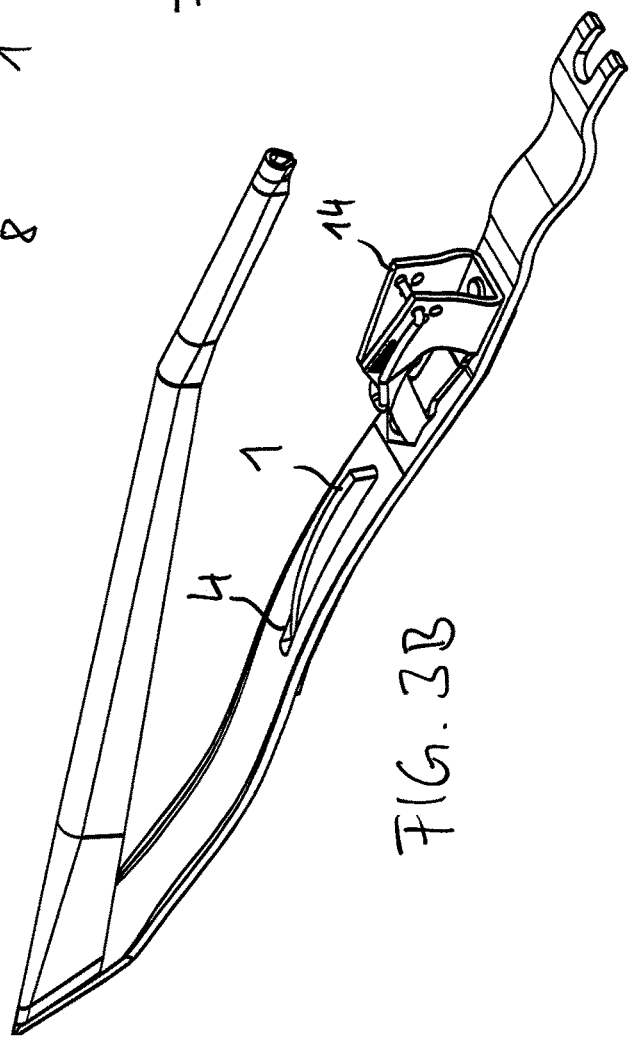

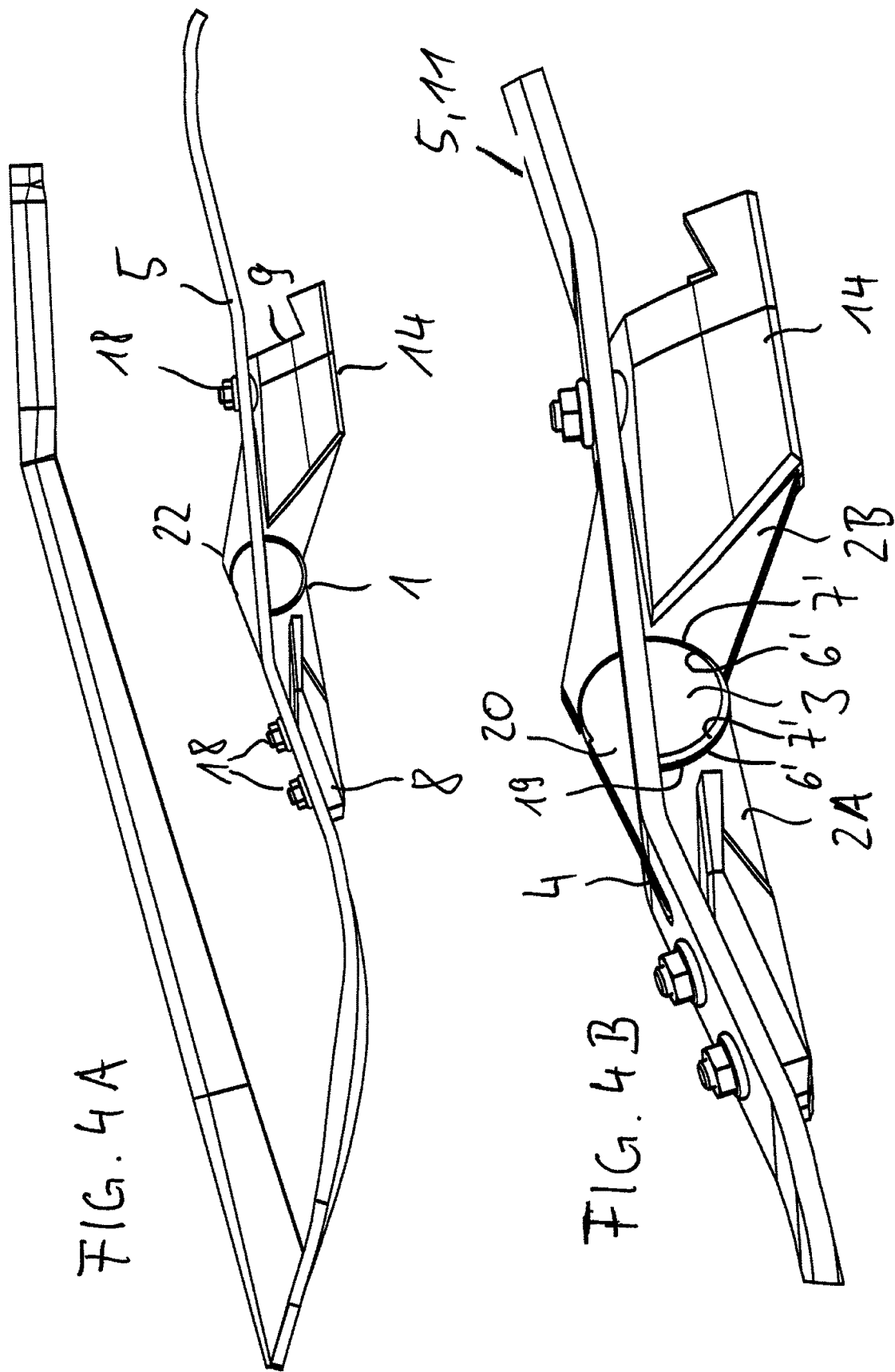

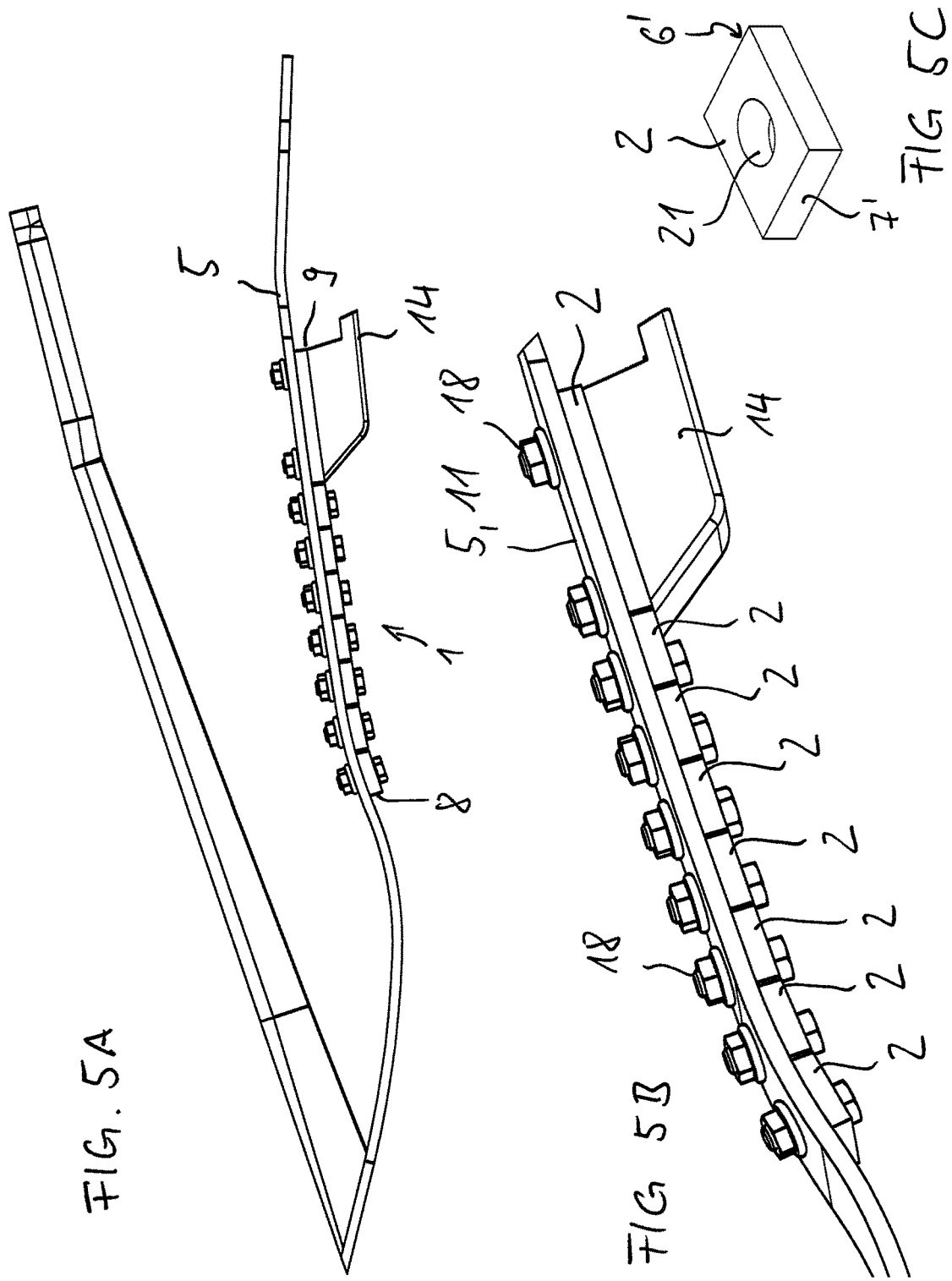

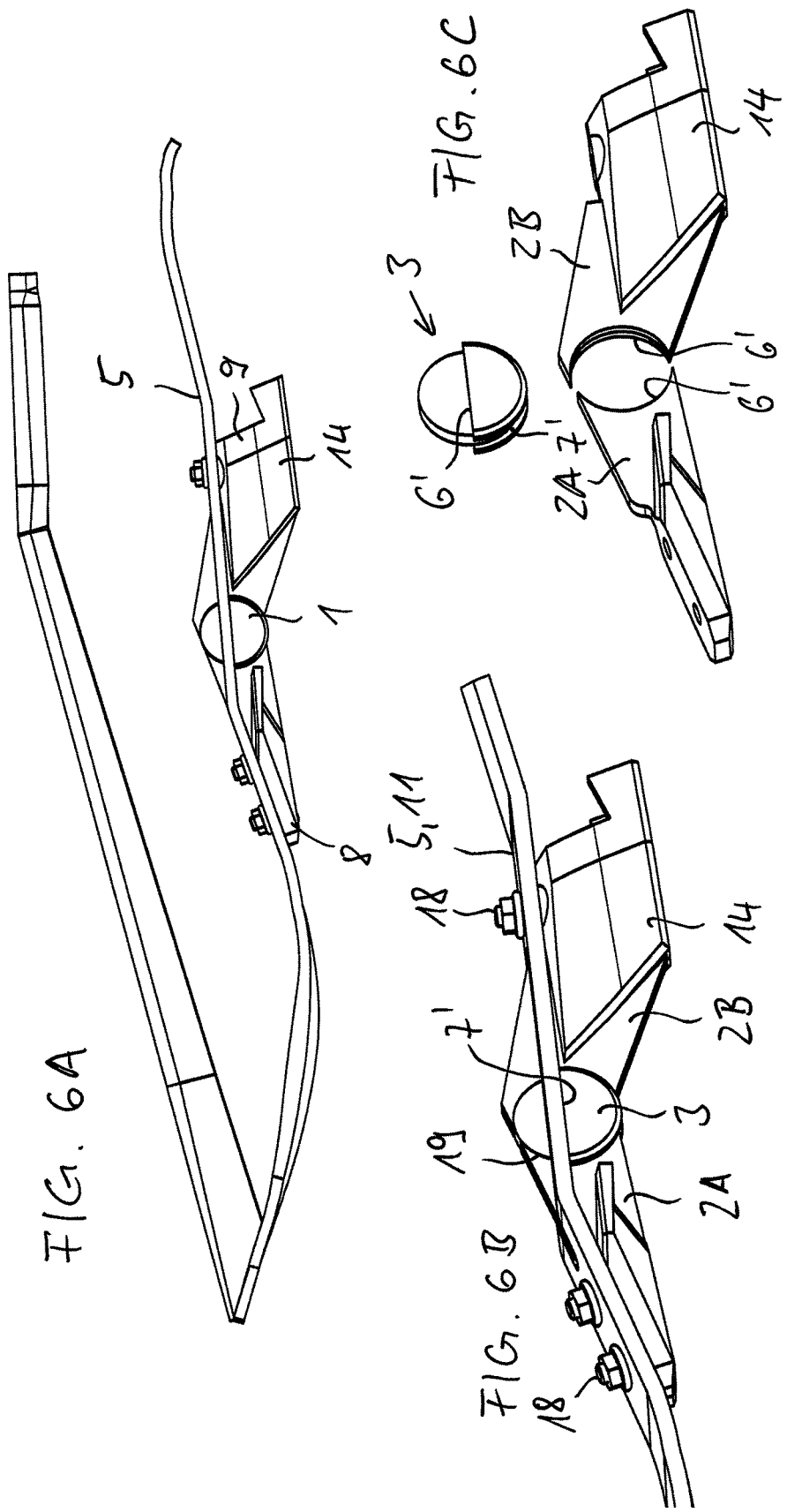

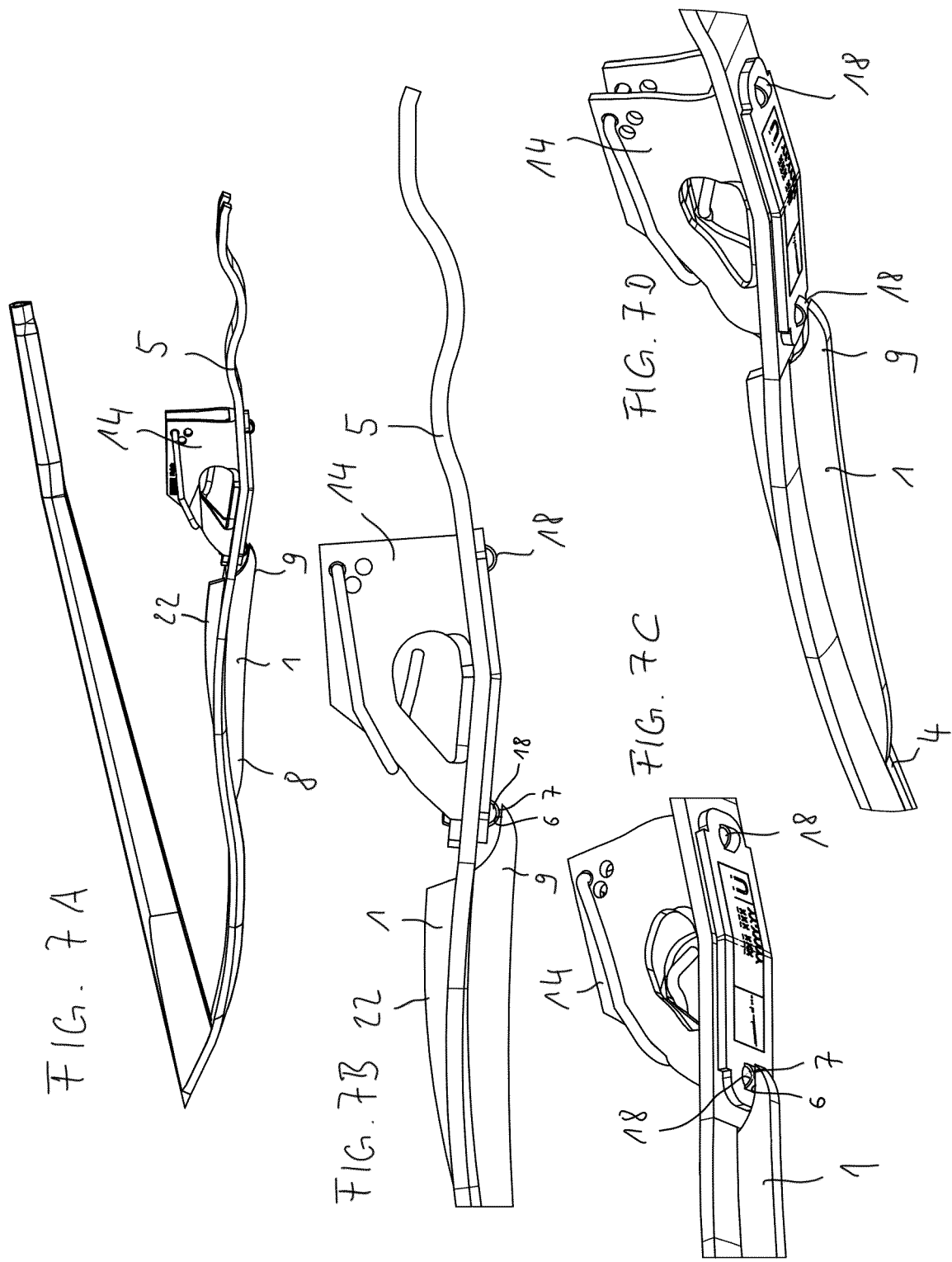

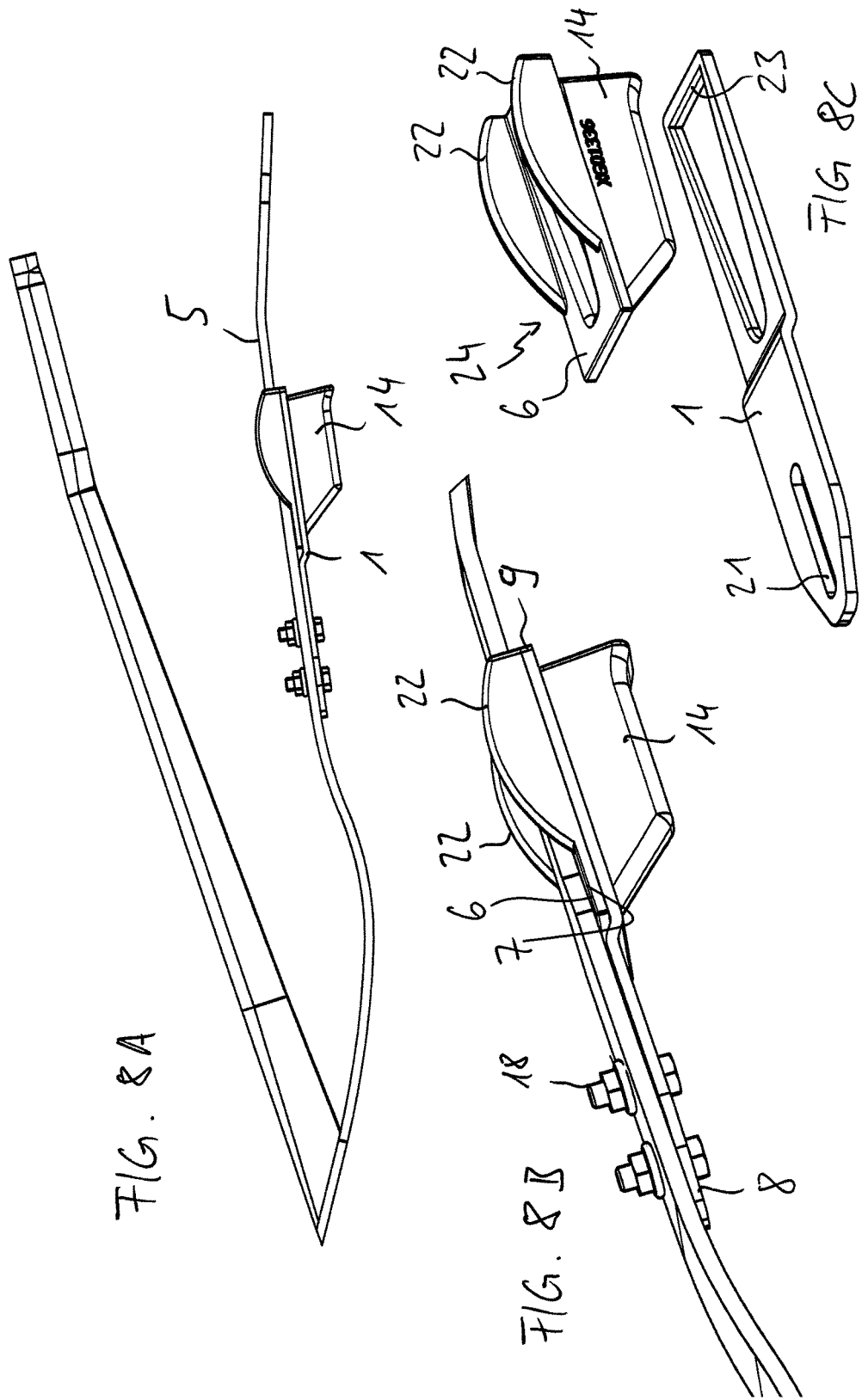

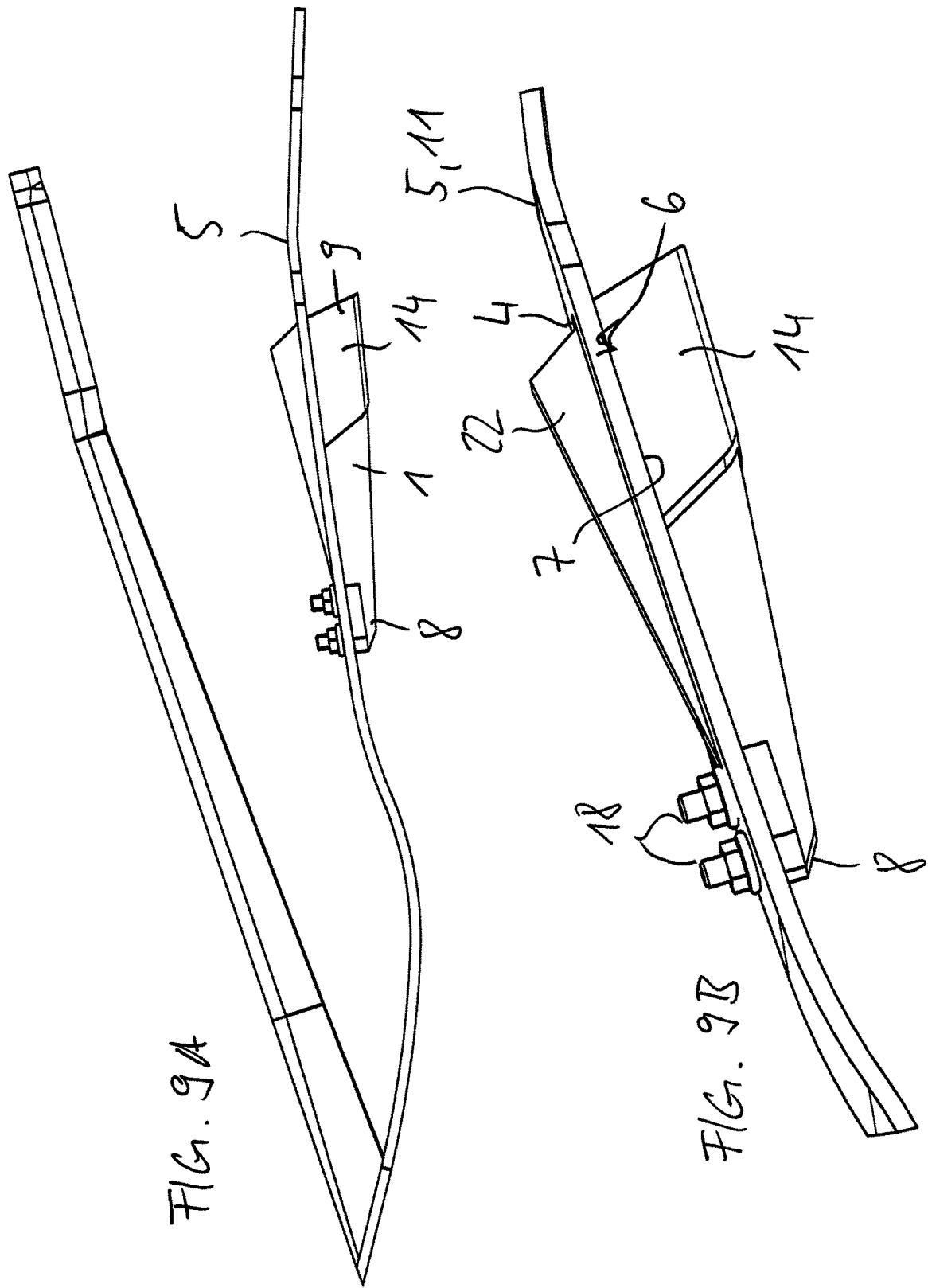

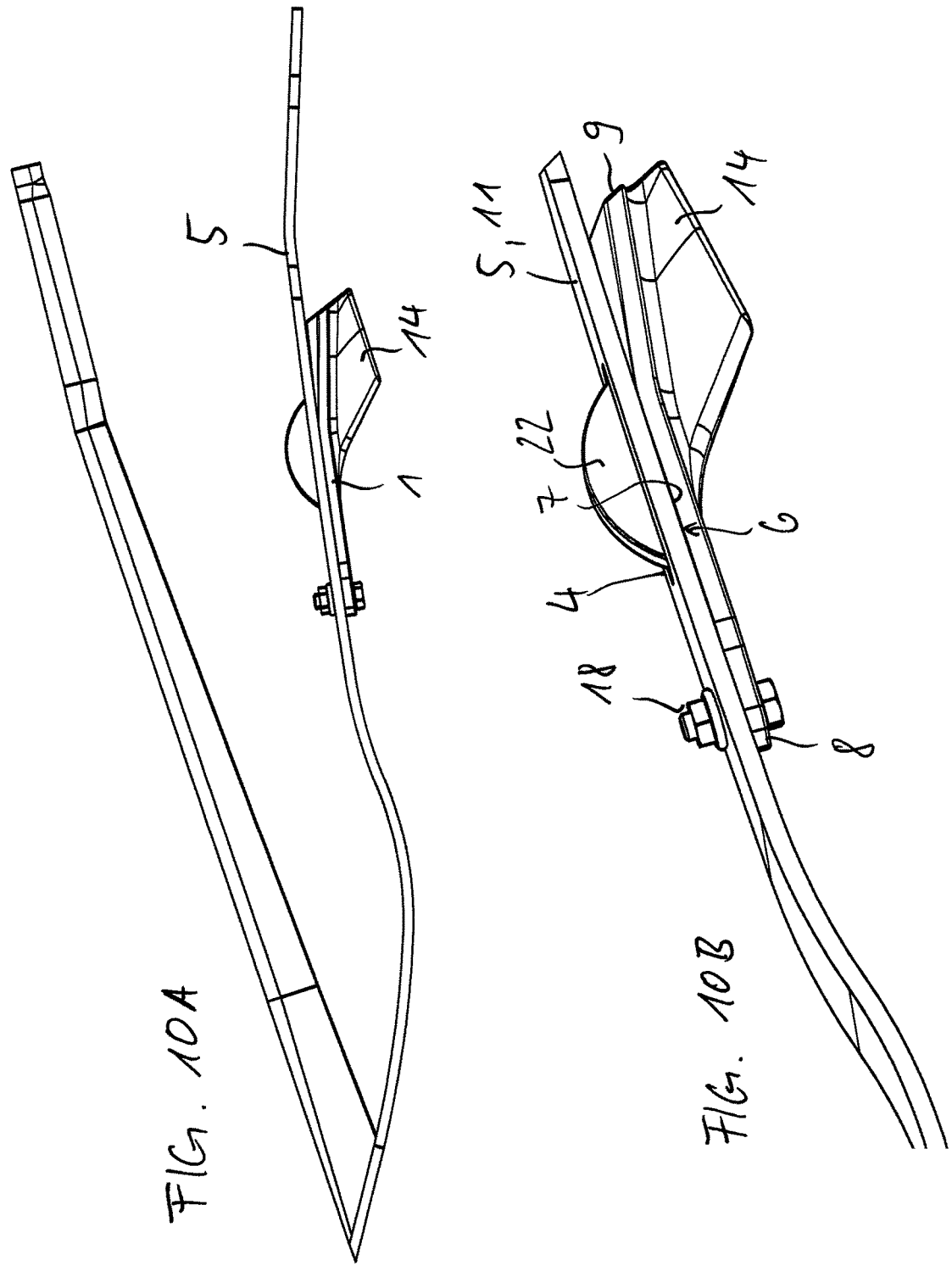

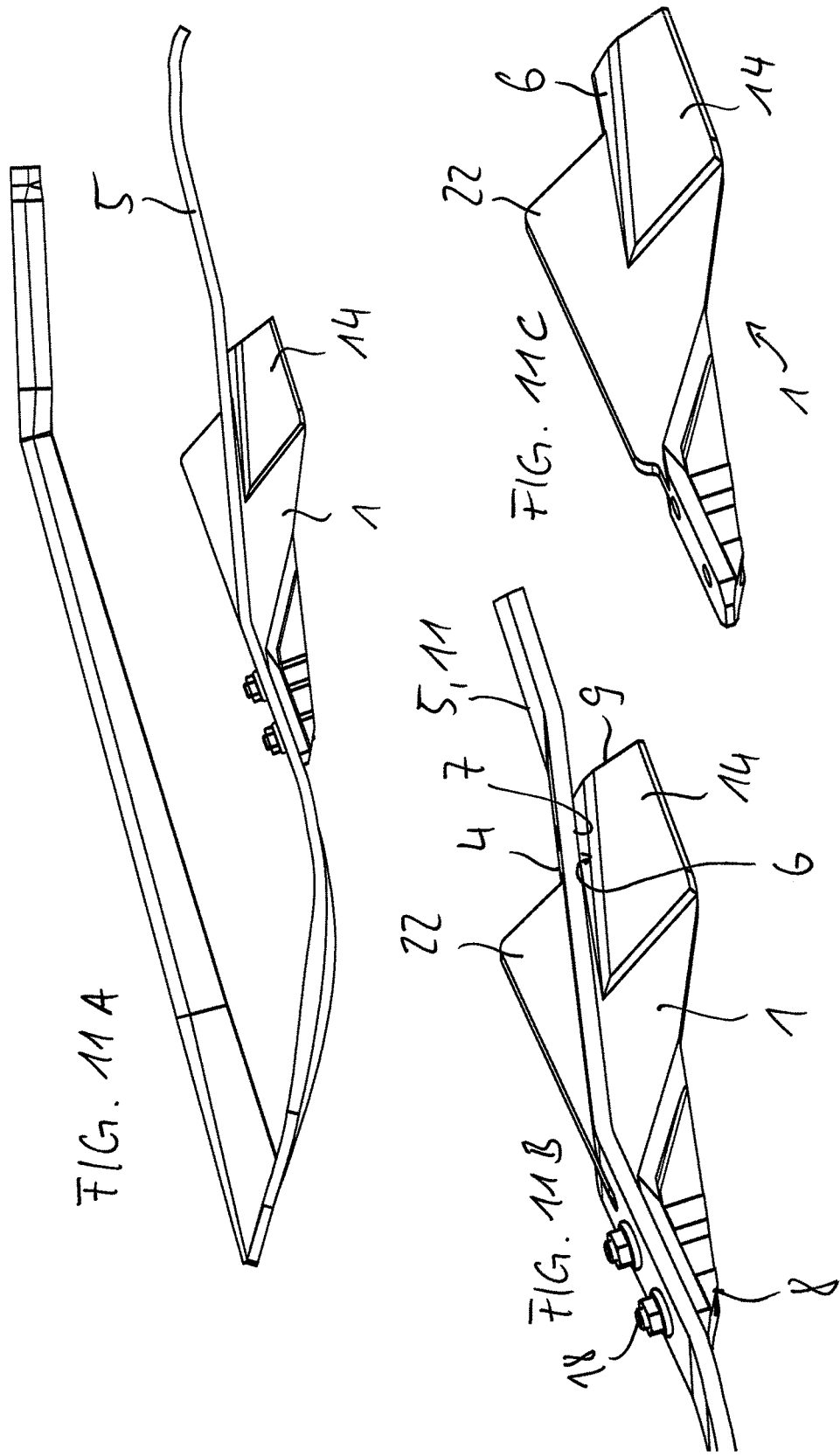

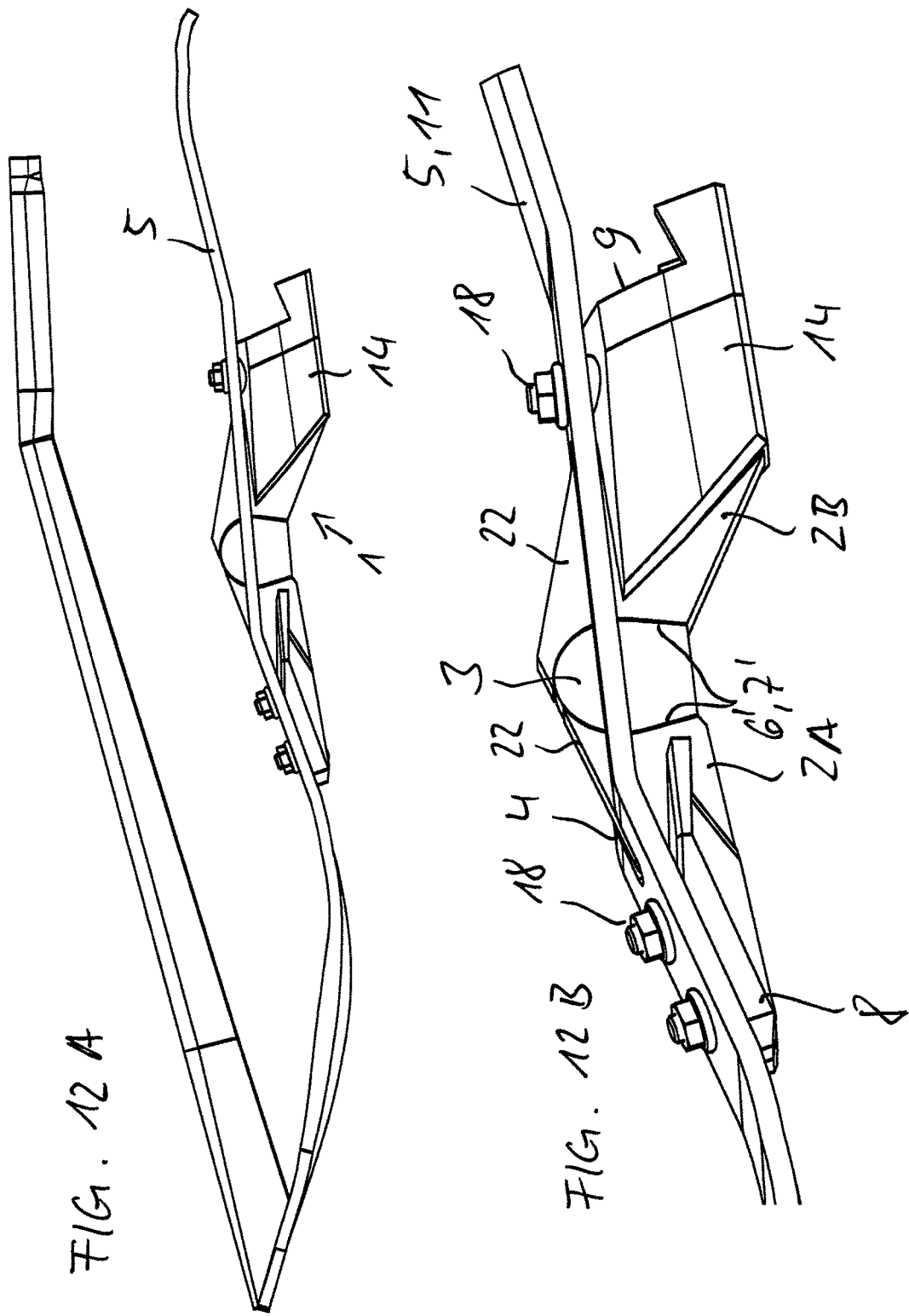

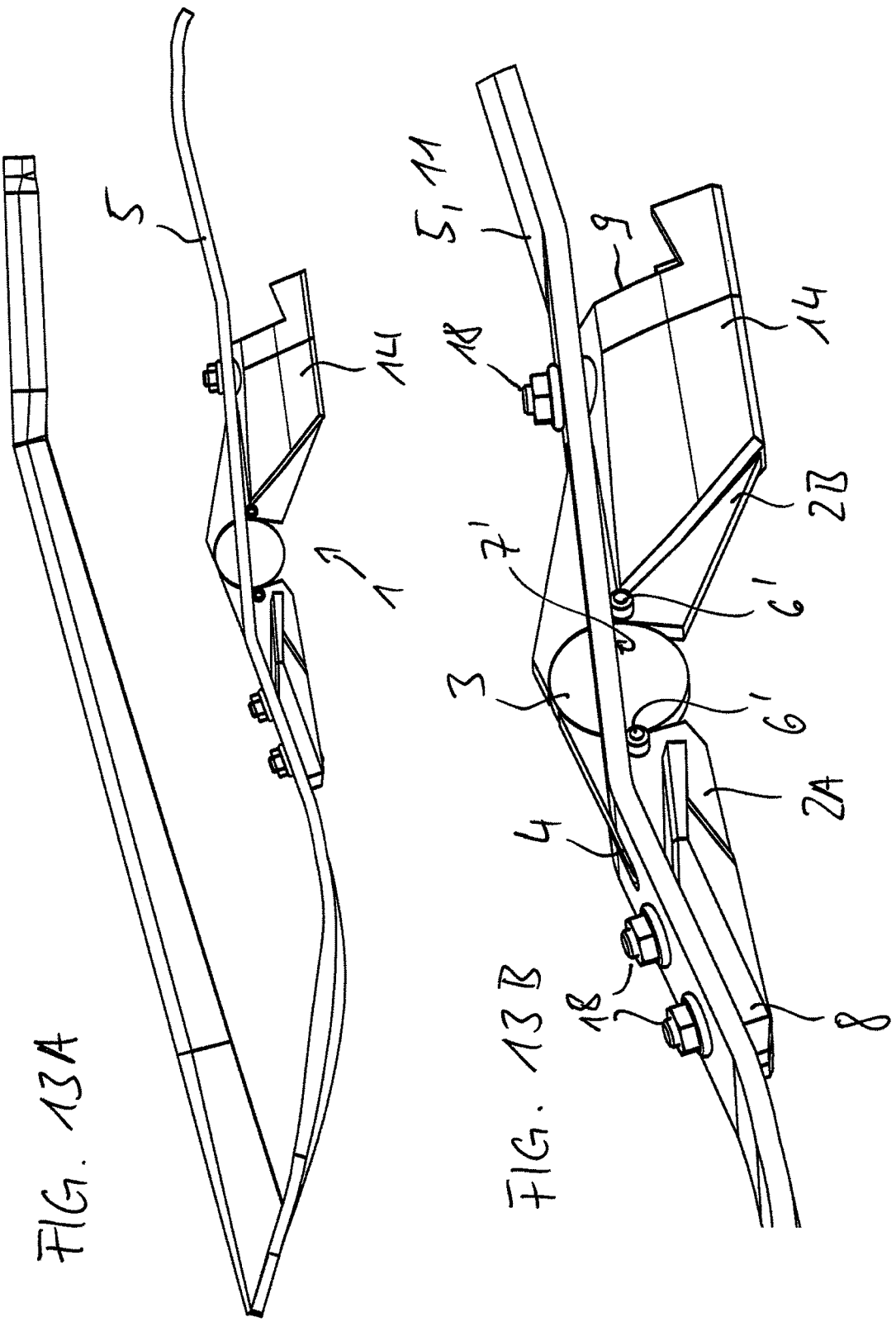

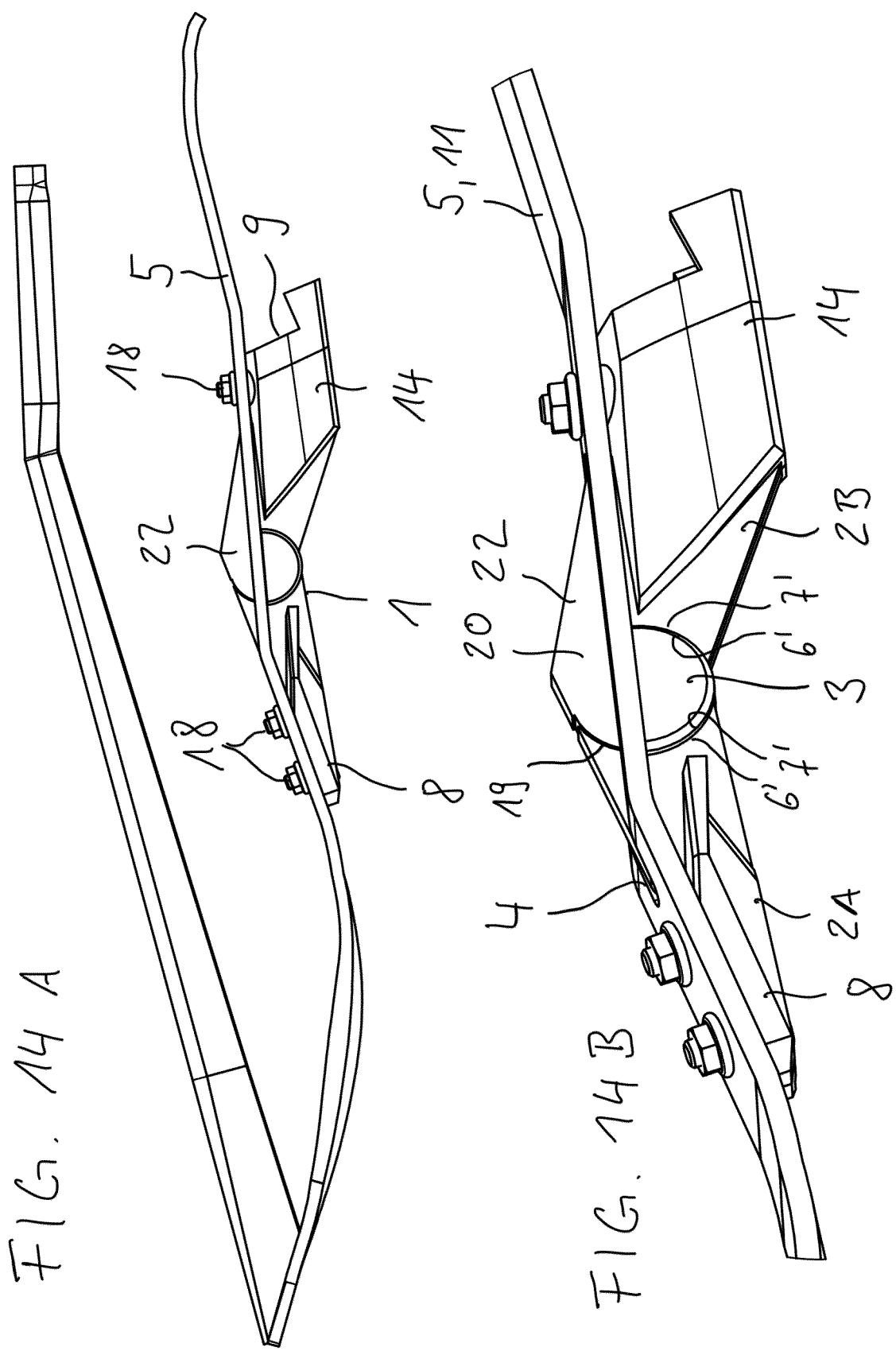

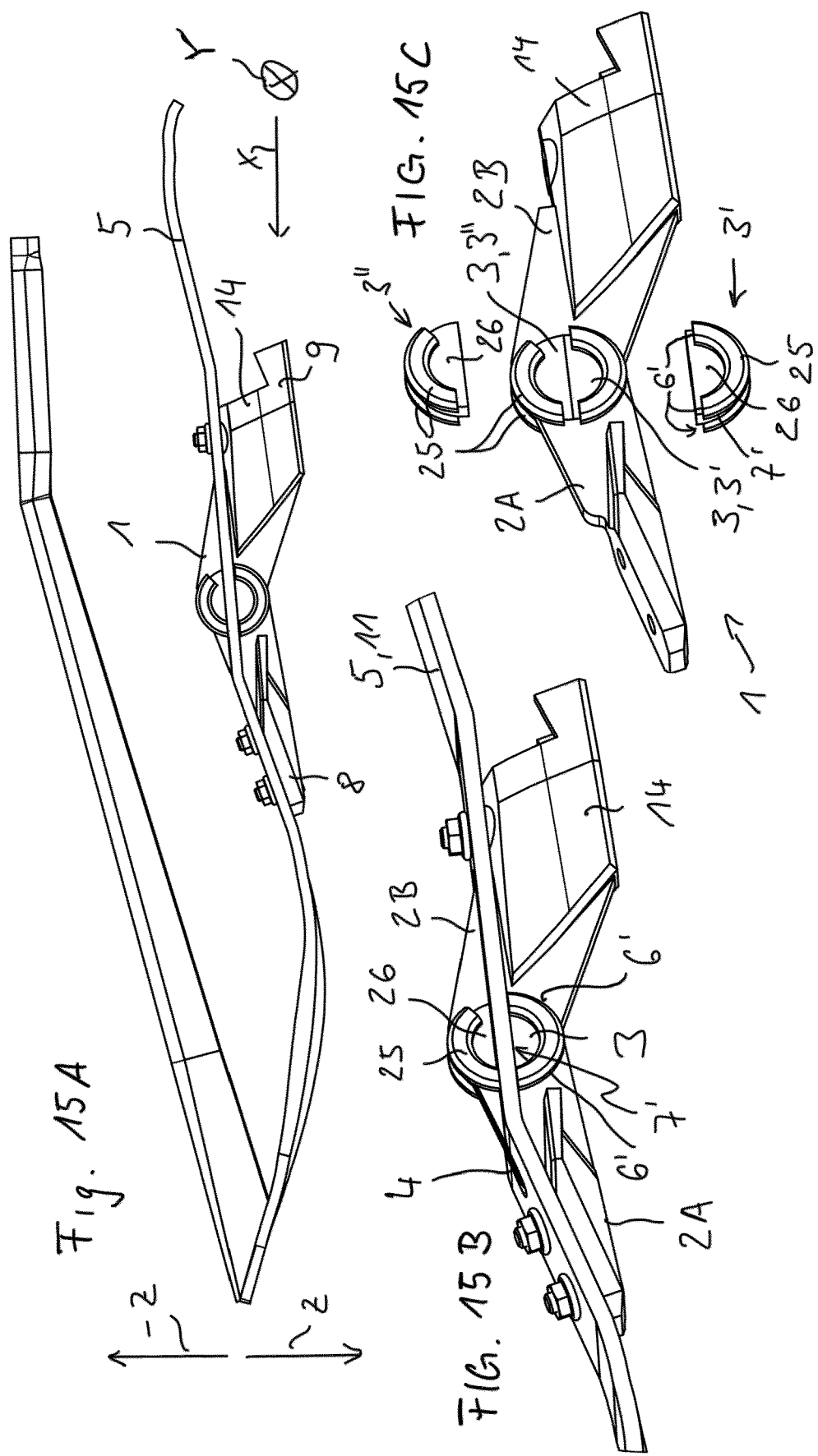

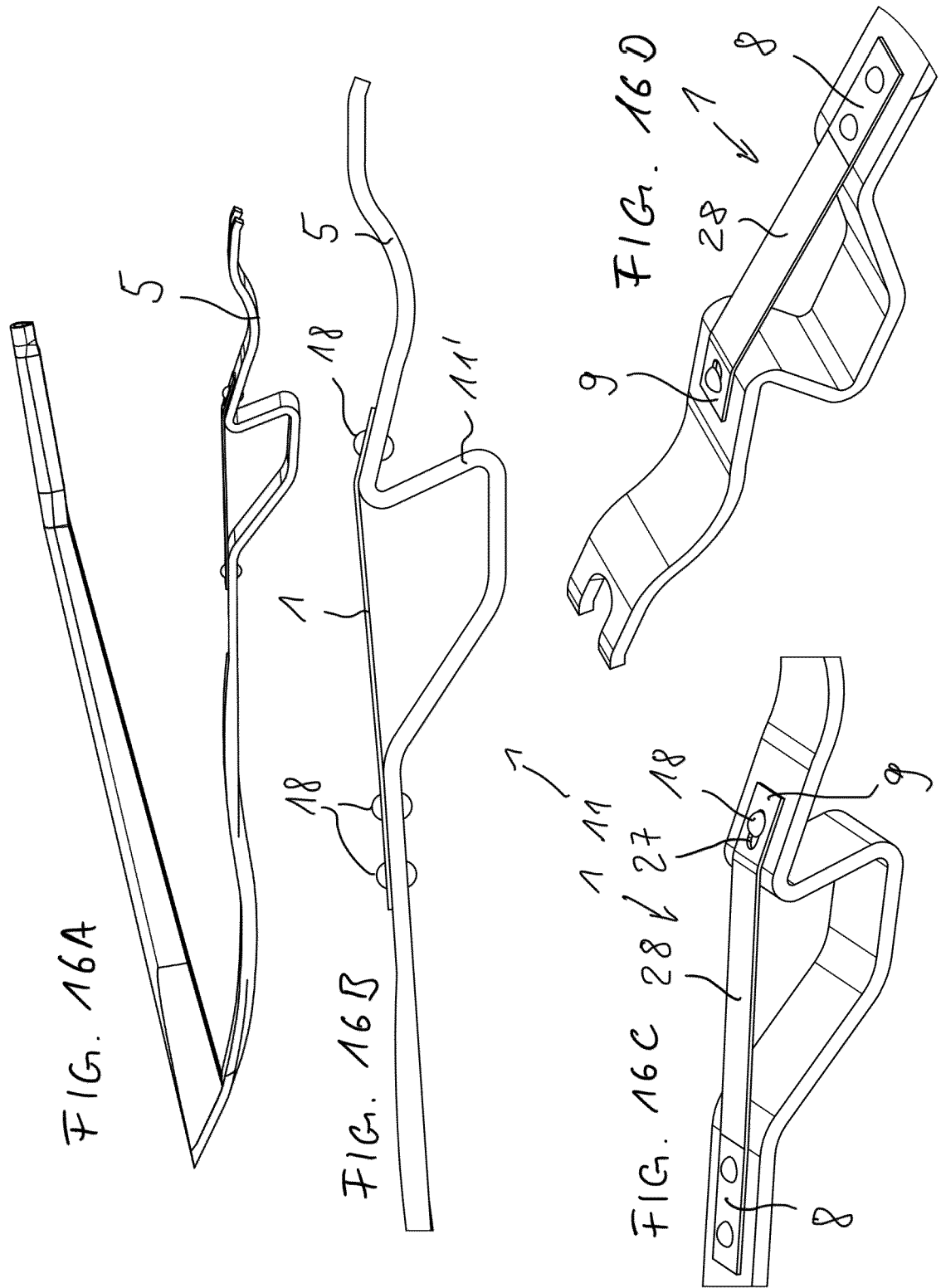

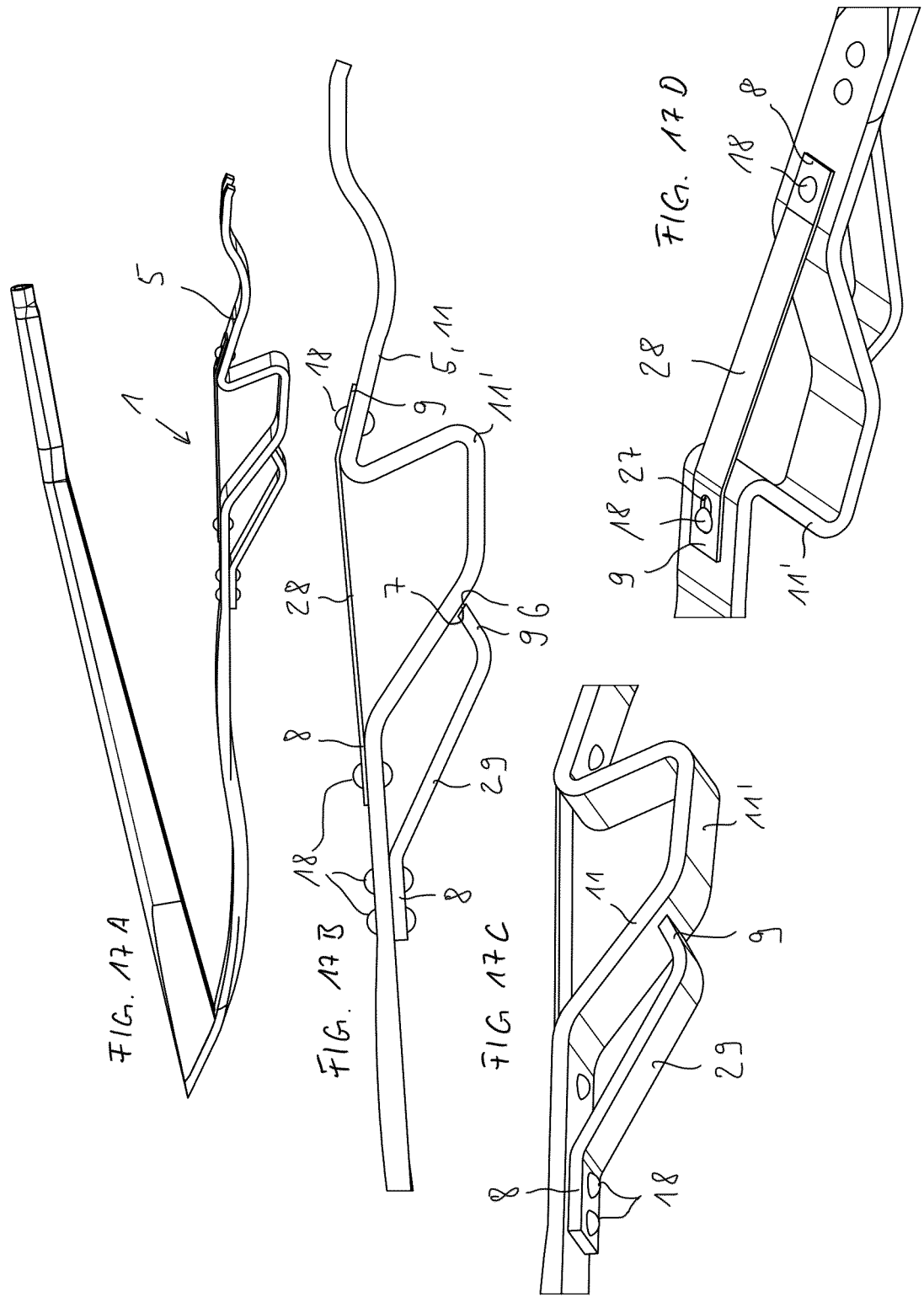

EAR LIFTER FOR CROPS

CROSS REFERENCE TO RELATED APPLICATIONS

This application is a National Stage of International Application No. PCT/EP2020/060958, filed Apr. 20, 2020, claiming priority to European Patent Application No. 19172022.6, filed Apr. 30, 2019.

TECHNICAL FIELD

The following disclosure relates to an ear lifter for crops having a support bar, wherein the support bar extends in a major direction of extension and has a fastening portion, a middle portion and a skid portion arranged one after the other in the major direction of extension.

BACKGROUND

Known mowing systems for harvesters have a so-called mower bar along which guards are arranged. The guards guide a cutter bar and form counter-blades for cutting knives, which are mounted on a reciprocating cutter bar. In order to be able to safely mow kinked or laid stalks, ear lifters are used to lift the stalks. Such ear lifters consist of a support bar, the fastening portion of which can be fixed to the mower bar and, if necessary, supported by a retainer on a tip of a guard. In accordance with the direction of travel of the harvester, the fastening portion forms the rear end of the support bar, to the opposite, front end of which a stalk lifting member is usually attached. This front end of the stalk lifter is guided as close to the ground as possible. In order to be able to follow ground unevenness, the support bar of known ear lifters is usually made of a spring steel. Such an ear lifter is known, for example, from EP 1 256 271 A1.

In the case of particularly strong ground unevenness or due to stones in the ground, the front end of the ear lifter can penetrate into the ground. A disadvantage of the known ear lifters with a support bar made of spring steel is that the support bar can be deflected downwards, i.e. into the ground, by the resistance of the front end immersed in the ground, which further increases the resistance. In such a case, the ear lifter is generally severely damaged to the extent that it must be replaced.

One object is to propose an ear lifter whose support bar can follow ground unevenness and which is less easily damaged when the support bar is briefly deflected into the ground.

SUMMARY OF THE INVENTION

The object is met by the subject-matter of claim 1. In the dependent claims, embodiments and further improvements are indicated.

According to an aspect, the ear lifter for crops has a support bar, wherein the support bar extends in a major direction of extension. Arranged one after the other in the major direction of extension, the support bar comprises a fastening portion, a middle portion, and a skid portion. The support bar is an elongated member extending in the major direction of extension, which is preferably made of a flat material. In the major direction of extension, the support bar has a swung, curved, non-rectilinear shape. The major direction of extension corresponds to the direction of travel of a harvesting machine when the ear lifter is mounted on the harvesting machine. In this case, the fastening portion in the direction of travel is located at the rear, while the skid portion in the direction of travel is located at the front. The support bar may have additional portions in front of, behind, or between said portions. For example, the front end of the support bar is generally located in front of the skid portion in the direction of travel. In terms of the invention, the middle portion refers to a section of the support bar between the skid portion and the fastening portion, wherein the exact location of the middle portion is not fixed to the actual center of the support bar.

The support bar has a restraining device, wherein the restraining device has a reinforcing effect with respect to a bending stress on the middle portion. An effect of the restraining device that reinforces the middle portion is greater with respect to a bending stress of the middle portion in a first bending direction than in a second bending direction opposite to the first bending direction.

One advantage of the ear lifter is that the support bar can be designed to be elastically deformable when bending stress is applied in the second bending direction in order to compensate for unevenness of the ground. The middle portion of the support bar is basically the portion that is elastically deformable for this purpose. In terms of the invention, elastically deformable means that the middle portion can be bent at least in such a way that the skid portion is deflected by one centimeter without plastic deformation of the middle portion occurring. Since the support bar in the mounted state is fixed to the harvester at the fastening portion while the front end is free, the support bar provides the bending properties of a cantilever beam. In the mounted state of the support bar, a deflection in the second bending direction corresponds to an upward deflection of the support bar. The opposite, first bending direction corresponds accordingly to a downward deflection in which the front end of the support bar can penetrate the ground. The locking element advantageously prevents bending of the middle portion in the first bending direction, so that overall the support bar can only be deflected slightly downwards, i.e. in the first bending direction. This advantageously prevents penetration of the front end of the support bar into the ground. As a result of the fact that the restraining device has less influence on the bending properties of the middle portion with respect to bending stress in the second bending direction, i.e. upwards, the support bar is easier to deflect upwards under bending stress in the second bending direction than downwards under bending stress in the first bending direction. As a result, the skid portion can advantageously follow uneven ground.

According to one embodiment, the restraining device is of no effect with respect to bending stress on the middle portion in the second bending direction. No effect in terms of the invention means that the restraining device has no significant influence on the bending properties of the middle portion when the middle portion is subjected to bending stress in the second bending direction.

For example, the support bar is made of a flat material, wherein the first bending direction and the second bending direction are aligned perpendicular to a secondary direction of extension and the major direction of extension of the support bar. The major direction of extension refers to the direction in which the support bar has the greatest extension. The secondary direction of extension designates the direction in which the support bar has the second largest extension after the major direction of extension. The extension of the support bar in the bending direction, or in the first bending direction and second bending direction, thus corresponds to the thickness of the support bar in the case of a flat material. In this case, the support bar does not run linearly in the major direction of extension, but is curved. The curved support bar thus has portions in the direction of extension and in the first and second bending directions.

According to an embodiment, the restraining device extends along the middle portion and is connected to the middle portion. Connected in terms of the invention means in the broadest sense the possibility of a force transmission from the restraining device to the middle portion and/or vice versa. In this context, the restraining device may be integrally designed with the middle portion, or connected by fastening means, such as screwed, welded or riveted connections. Likewise, a detachable push-fit connection can be provided between the restraining device and the middle portion. Alternatively, embodiments are conceivable in which the restraining device spans the middle portion and has a reinforcing effect on the middle portion, for example indirectly, via the skid portion and/or via the fastening portion.

The restraining device has, for example, a tension element and/or a pressure element. The pressure element is subjected to pressure under the bending stress in the first bending direction and thereby has a reinforcing effect with respect to a bending stress on the middle portion. The stiffening effect of the pressure element is greater with respect to bending stress on the middle portion in the first bending direction, since the pressure element absorbs compressive forces, while it is free to move, for example, or at least absorbs smaller forces when the middle portion is subjected to bending stress in the second bending direction. Additionally or alternatively, the restraining device has a tension element. The tension element is subjected to tensile stress under the bending stress in the first bending direction and thus has a reinforcing effect with respect to a bending stress on the middle portion. The reinforcing effect of the tension element is greater with respect to the bending stress on the middle portion in the first bending direction than in the second bending direction, in that tensile forces that can be transmitted via the tension element are greater than compressive forces that can be transmitted via the tension element. The tensile element is, for example, a rope or a spring sheet.

According to a further embodiment, the restraining device has a first end and a second end, wherein the first end is connected to the middle portion of the support bar. For example, the restraining device is connected to the middle portion at at least one point. According to an embodiment, two or more connections of the restraining device to the middle portion are provided.

According to an embodiment, the restraining device thus forms a joint with the middle portion, wherein a movement of the joint is blocked by the bending stress of the middle portion in the first bending direction in at least one degree of freedom of the joint. A movement of the joint in the at least one degree of freedom by the bending stress of the middle portion in the second bending direction is free. As a result, the joint formed by the middle portion and the restraining device is reinforced with respect to the bending stress of the middle portion in the first bending direction and is not reinforced with respect to the bending stress of the middle portion in the second bending direction.

According to an embodiment, it is provided that a relative movement of the restraining device to the middle portion is caused under the bending stress, wherein the relative movement under the bending stress in the first bending direction is more restricted than under the bending stress in the second bending direction. Particularly preferably, the relative movement under the bending stress in the first bending direction is blocked by the restraining device.

According to an embodiment, the restraining device comprises at least a first stop, wherein the first stop cooperates with a second stop to block the relative movement under the bending stress in the first bending direction. In particular, the first stop cooperates with the second stop such that the movement in at least one degree of freedom of the joint under the bending stress in the first bending direction is blocked.

According to an embodiment, it is provided that the second stop is formed on the support bar.

Furthermore, the restraining device can be formed in multiple parts with at least two restraining members. The multi-part restraining device is formed in particular from interconnected restraining members. The restraining members are, for example, designed to be movable with respect to one another. In particular, the restraining members of the restraining device form a restraining member joint. For example, a plurality of the restraining members are connected to the support bar in the middle portion. In particular, all of the restraining members of the restraining device in the middle portion are connected to the support bar.

According to a further preferred embodiment, it is provided that the second stop is formed on the restraining device.

According to an embodiment, it is provided that the first stop is divided into at least two first partial stops and the second stop is divided into at least two second partial stops, wherein the respective first partial stops cooperate with the respective second partial stops to block the relative movement under the bending stress in the first bending direction, or to block the movement of the joint in at least one of its degrees of freedom. The first partial stops and the second partial stops in terms of the invention are to be understood as separate stops, which are referred to herein as partial stops, since the first partial stops and the second partial stops together have the same effect as the single formed first stop and the single formed second stop. For this purpose, the first partial stops and the second partial stops do not necessarily have to come into contact with each other at the same time under the bending stress in the first bending direction, but this can also take place with a time offset.

According to an embodiment, the restraining members are angularly displaceable relative to each other about an axis perpendicular to the major direction of extension, wherein angular displacement in the first bending direction is blocked by the restraining members and is free in the second bending direction. The joint formed by the middle portion and the restraining device is in this case a swivel joint. The restraining member joint formed by the restraining members is also a swivel joint in this case.

According to an embodiment, it is provided that the restraining device comprises a first restraining member and a second restraining member, wherein the first restraining member is connected to the second restraining member via a pivot point. The term pivot point in terms of the invention is to be understood as a component which connects the first restraining member to the second restraining member and enables an angular displacement of the first restraining member relative to the second restraining member. The term pivot point does not restrict the component to a point-like configuration. In particular, the pivot point may be formed as a stud, wherein the pivot joint formed by the first restraining member, the second restraining member and the pivot point is formed in the manner of a hinge. The pivot point formed as a stud does not necessarily have to have an elongated shape. Rather, it is provided in particular that a diameter of the pivot point formed as a stud is greater than its length.

According to an embodiment, the first stop is arranged at the pivot point, wherein the second stop is arranged at the support bar. According to an embodiment, the first stop at the pivot point allows angular displacement of the first restraining member relative to the second restraining member under a bending stress in the second bending direction by the first stop moving away from the second stop on the support bar. Under bending stress in the first bending direction, the first stop comes into contact with the second stop on the support bar at the pivot point, thereby blocking further angular displacement of the first restraining member relative to the second restraining member. The first stop is formed in particular as a shoulder or projection on the stud-shaped pivot point. The second stop on the support bar is preferably formed by the support bar itself.

According to an embodiment, one of the first partial stops is arranged on the first restraining member and another of the first partial stops is arranged on the second restraining member, wherein the second partial stops are arranged on the support bar. This embodiment is an alternative to the previously described embodiment, which has basically the same effect. Instead of the first stop at the pivot point, two separate first partial stops are arranged on the first restraining member and the second restraining member, which come into contact with the support bar under bending stress in the first bending direction and thus block further angular displacement of the first restraining member relative to the second restraining member in the first bending direction. The second partial stops are preferably formed by those points on the support bar at which the first partial stops come into contact with the support bar.

According to an embodiment, it is provided that one of the first partial stops is arranged on the first restraining member and another of the first partial stops is arranged on the second restraining member, wherein the second partial stops are arranged on the pivot point. For this purpose, in particular the pivot point is configured such that the first restraining member is angularly displaceable relative to the second restraining member over a first circumferential range of the pivot point, while the angular displaceability of the first restraining member and the second restraining member are blocked over a second circumferential range of the pivot point. Preferably, for this purpose, the stud-shaped pivot point has a cross-section that deviates from a circular shape. The areas deviating from the circular shape also form the second partial stops in the second circumferential range.

According to an embodiment, it is provided that the support bar has a recess in the middle portion, wherein at least a portion of the restraining device extends through the recess. The joint thus formed by the middle portion and the restraining device corresponds to a rotational prismatic joint. Preferably, the second stop is formed on the recess. As a result, the thrust movement in the rotational prismatic joint is advantageously blocked by the second stop. In particular, the first stop is formed on the restraining device.

According to an embodiment, it is provided that a retainer is arranged on the support bar, wherein the retainer serves to provide support on a guard. Particularly preferably, the retainer is formed on the restraining device. For example, the retainer forms the second end of the restraining device.

DESCRIPTION OF THE DRAWINGS

In the following, the invention will be explained in more detail by means of embodiments with reference to the accompanying drawings. The embodiments are exemplary and do not limit the general idea of the invention.

In the Figures show

FIGS. 1a and 1b a first embodiment of the ear lifter according to the invention in various views, FIGS. 2a, 2b and 2c a further embodiment of the ear lifter according to the invention in various views, FIGS. 3a, 3b and 3c a further embodiment of the ear lifter according to the invention in various views, FIGS. 4a and 4b a further embodiment of the ear lifter according to the invention in various views, FIGS. 5a, 5b and 5c a further embodiment of the ear lifter according to the invention in various views, FIGS. 6a, 6b and 6c a further embodiment of the ear lifter according to the invention in various views, FIGS. 7a, 7b, 7c and 7d a further embodiment of the ear lifter according to the invention in various views, FIGS. 8a, 8b and 8c a further embodiment of the ear lifter according to the invention in various views, FIGS. 9a and 9b a further embodiment of the ear lifter according to the invention in various views, FIGS. 10a and 10b a variation of the embodiment according to FIG. 2a in various views, FIGS. 11a, 11b and 11c a variation of the embodiment according to FIG. 9a in various views, FIGS. 12a and 12b a further embodiment of the ear lifter according to the invention in various views, FIGS. 13a and 13b a further embodiment of the ear lifter according to the invention in various views, FIGS. 14a and 14b a further embodiment of the ear lifter according to the invention in various views, FIGS. 15a, 15b and 15c a further embodiment of the ear lifter according to the invention in various views, FIGS. 16a, 16b, 16c and 16d a further embodiment of the ear lifter according to the invention in various views, FIGS. 17a, 17b, 17c and 17d a further embodiment of the ear lifter according to the invention in various views.

DETAILED DESCRIPTION

FIGS. 1a and 1b show a first embodiment of the ear lifter according to the invention, wherein FIG. 1a shows a side view and FIG. 1b a perspective view. The ear lifter for crops according to the invention has a support bar 5, which extends in a major direction of extension X. The major direction of extension X is shown by an arrow in FIG. 1a. The major direction of extension X corresponds to a direction of travel of a harvesting machine when the ear lifter is mounted according to the invention. In the perspective view of FIG. 1b, it can be seen that the support bar 5 is made of a flat material with its secondary direction of extension Y oriented orthogonally to the major direction of extension X. In FIG. 1a, the secondary direction of extension Y is directed into the drawing plane. A third spatial direction, which is oriented orthogonally to the major direction of extension X and the secondary direction of extension Y, is designated by the reference sign Z, wherein the third spatial direction Z is shown here in FIG. 1a by two arrows. The arrow labeled with the reference sign Z indicates the positive direction, while the arrow labeled with −Z indicates the opposite, i.e. negative, direction. In operation, the ear lifter is guided close over the ground, which causes it to be deflected by uneven ground or by larger stones in the ground. For this purpose, the support bar 5 is designed to be flexible at least in some areas, so that the support bar can be bent in the spatial direction Z. In the following, the positive spatial direction Z is referred to as the first bending direction Z and the opposite spatial direction Z is referred to as the second bending direction −Z. If the support bar 5 is bent in the first bending direction Z, for example because a tip 17 of the ear lifter has penetrated an unevenness in the ground, there is a risk that the support bar 5 will be bent further in the direction of the first bending direction Z and the elastic resilience of the support bar will not be sufficient to return the tip 17 of the ear lifter above the ground. In that case, plastic deformation occurs in the first bending direction Z, so that the damaged ear lifter has to be replaced. This problem is avoided by the ear lifter according to the invention.

The support bar 5 has, arranged one after the other in the major direction of extension X, a fastening portion 10, a middle portion 11 and a skid portion 12. With respect to the direction of travel of the harvester, the fastening portion 10 is arranged at the rear and serves to fasten the support bar to a mower bar of the harvester, which is not shown. The skid portion 12 is located near a front end 17 or tip 17 of the support bar 5. The skid portion 12 is for guiding the ear lifter over the ground surface. A stalk lifter 16 is generally attached to the front end 17 of the support bar 5. A retainer 14 is arranged on the lower side of the support bar 5, which serves to receive a guard (not shown) of the harvester. The middle portion 11 of the support bar 5 is the portion in which the deflection of the support bar 5 substantially takes place. The middle portion 11 is arranged between the fastening portion 10 and the skid portion 12, without being defined at the actual center of the support bar 5 and without necessarily being directly adjoining the adjacent fastening portion 10 and the skid portion 12.

The basic configuration of the ear lifter according to the invention described so far also applies to the further embodiments to be described below, so that the basic configuration is not described again below for each embodiment. The major direction of extension X, the secondary direction of extension Y, the first bending direction Z and the second bending direction −Z are shown only in FIG. 1a, but apply equally to all side views of the embodiments to be described below.

In the embodiment according to FIGS. 1a and 1b, which are described together below, the support bar 5 has a restraining device 1 in the middle portion 11. This restraining device 1 has a reinforcing effect with respect to a bending stress on the middle portion 11 in the first bending direction Z. In contrast, the restraining device 1 is ineffective with respect to a bending stress on the middle portion 11 in the second bending direction −Z. In terms of the invention, ineffective is to be understood as meaning that bending of the support bar in the second bending direction −Z is possible and is not hindered by the restraining device 1. The restraining device 1 has a front end 8 and a rear end 9, wherein the terms front and rear refer to the direction of travel of the harvesting machine. In the exemplary embodiment shown, the front end 8 of the restraining device 1 is connected to the support bar 5, wherein the type of connection can be chosen as desired. In the illustrated exemplary embodiment, the front end 8 of the restraining device 1 is welded to the support bar 5, for example. The restraining device 1 is, for example, a metal plate with its major directions of extension arranged in the major direction of extension X and in the bending direction Z. Such a plate, which is arranged substantially perpendicular to the flat material of the support bar 5, is also referred to as a stiffening plate, for example. In the exemplary embodiment shown, the support bar 5 has a recess 4 in the form of a slot in the middle portion 11, wherein the plate of the restraining device 1 extends through this slot. As a result, the restraining device 1 is guided in the recess 4 and cannot bend in the secondary direction of extension Y, for example. The restraining device 1 is not connected to the support bar 5 at more than one point or over its entire length in the manner of a stiffening plate, since such stiffening would hinder or substantially prevent bending of the support bar 5 not only in the first bending direction Z, but also in the second bending direction −Z. Instead, the restraining device 1 is connected to the support bar 5 only at its front end 8 and has a first stop 6 at its rear or second end 9, which rests against a second stop 7 on the support bar 5. The second stop 7 on the support bar 5 is formed by a curvature of the support bar 5. When the support bar 5 is subjected to a bending load in the second bending direction −Z, the support bar 5 is bent in the middle portion 11, which is formed resiliently, so that the first stop 6 on the restraining device 1 moves away from the second stop 7 on the support bar 5. The restraining device 1 therefore does not impede the bending of the support bar 5 in the second bending direction −Z. In contrast, when bending stress is applied in the first bending direction Z, the first stop 6 on the restraining device 1 is pressed against the second stop 7 on the support bar 5, so that the restraining device 1 has a reinforcing effect against the deflection of the support bar 5. In other words, the restraining device 1 forms a joint with the middle portion 11 of the support bar 5, in this case a rotational-sliding joint, since the restraining device 1 is guided in the slot-shaped recess 4. The rotational-sliding movement, which is caused by a bending stress on the support bar 5 in the first bending direction Z, is blocked by the first stop 6 on the restraining device 1 and the second stop 7 on the support bar 5, while the rotational-sliding movement of the joint is possible under a bending stress on the support bar 5 in the second bending direction −Z.

FIG. 2a shows a further embodiment of the ear lifter according to the invention in a side view. FIG. 2b shows the middle portion 11 of the support bar 5 in a perspective view in detail, and FIG. 2c shows the locking element alone in a perspective view in detail. FIGS. 2a, 2b and 2c will be described together below. In the embodiment shown, the restraining device 1 comprises a plate-shaped member, which is attached to the support bar 5 by the first end 8 of the restraining device 1 by a fastener 18. The plate-shaped member of the restraining device 1 has its major directions of extension in a plane defined by the major direction of extension X and the secondary direction of extension Y. The restraining device 1 is thus arranged with its plate-shaped member substantially parallel to the support bar 5 and rests against it. The restraining device 1 has a guide element 22 projecting perpendicularly from the plate-shaped member, which is guided through the slot-like recess 4 of the support bar 5. The retainer 14 for the guard is provided at the trailing second end 9 of the restraining device 1. The first stop 6 is formed on the upper side of the restraining device 1 facing the support bar 5, while the second stop 7 is formed on the lower side of the support bar 5 facing the restraining device 1. When bending stress is applied to the support bar 5 in the first bending direction Z, the first stop abuts the second stop so that the restraining device acts as a reinforcement of the support bar 5 in the middle portion 11. In contrast, when the support bar 5 is subjected to bending stress in the second bending direction −Z, the second end 9 of the restraining device 1, which is not connected to the support bar 5, moves away from the support bar 5, so that the first stop no longer bears against the second stop. As a result, the restraining device 1 has no significant influence on the bending properties of the support bar 5 in the second bending direction −Z. The retainer 14 formed on the restraining element 1 is therefore dimensioned larger than usual so that the finger guard, onto which the retainer 14 is fitted (not shown), provides sufficient clearance to ensure deflection of the support bar 5 in the second bending direction −Z.

FIG. 3*a* shows a further embodiment of the ear lifter according to the invention in a side view. FIG. 3*b* shows the embodiment in a perspective view. In FIG. 3*c*, a detail is shown enlarged in a further perspective view. In the following, FIGS. 3*a*, 3*b* and 3*c* will be described together. The restraining device 1 is attached to the support bar 5 by the first end 8 and consists essentially of a plate, which is oriented with its major directions of extension perpendicular to the support bar 5. A guide element 22 of the restraining device 1 is guided in a slot-like recess 4 of the support bar 5. The first stop 6 on the restraining device 1 is formed at the second end 9 thereof and abuts the second stop 7 on the support bar 5. In the exemplary embodiment, the second stop 7 is formed by the fastener 18 with which the retainer 14 is fastened to the upper side of the support bar 5. The fastener 18 is, for example, a rivet head. When the support bar 5 is subjected to a bending load in the first bending direction Z, the relative movement of the restraining device 1 with respect to the support bar 5 is blocked because the first stop 6 rests against the second stop 7. A movement of the restraining device 1 relative to the support bar 5 in the major direction of extension X is limited by the fastener 18. Thus the restraining device has a reinforcing effect. Under a bending load in the second bending direction −Z of the support bar 5, the first stop 6 moves away from the second stop 7. The restraining device 1 can move relative to the support bar 5 and thus does not reinforce the support bar 5 against the bending load in the second bending direction −Z.

FIG. 4*a* shows a further embodiment of the ear lifter according to the invention in a side view. In FIG. 4*b*, the middle portion 11 of the support bar 5 is shown in a perspective view. The restraining device 1 is connected to the support bar 5 at its front end 8 by means of two fastening elements 18. In the exemplary embodiment shown, the restraining device 1 is formed in two parts and comprises a first restraining member 2A and a second restraining member 2B. The attached front end 8 is arranged on the first restraining member 2A. In the exemplary embodiment, the second end 9 of the restraining device is also connected to the support bar 5 by a fastener 18. The second end 9 is located at the second restraining member 2B. The support bar 5 has a slot-shaped recess 4 in which a guide element 22 of the restraining device is guided. The first restraining member 2A is connected to the second restraining member 2B via a pivot point 3, which also extends through the recess 4. The pivot point 3 is in particular a circular disc, which is separated from the first restraining member 2A and from the second restraining member 2B by a slot 19. Thus, the pivot point 3 works in the manner of a hinge. The pivot point is not connected to the second restraining member 2B. The pivot point 3 is connected to the first restraining member 2A via a connection 20, since the slot 19 does not extend into the vicinity of the connection 20. In the embodiment shown, there are now a plurality of first and second stops which act together to allow reinforcement of the support bar 5 by the restraining device 1 under bending stress in the first bending direction Z, but not in the opposite second bending direction −Z. In the case of a plurality of spatially separated stops, the designation first partial stops 6' and second partial stops 7' will be used hereinafter. The first partial stops 6' are arranged in the vicinity of the slot 19, namely at the first restraining member 2A and at the pivot point 3. The first partial stops 6' rest respectively against second partial stops 7', which are thus also arranged in the vicinity of the slot 19, namely correspondingly at the pivot point 3 and at the second restraining member 2B. Under a bending stress on the support bar 5 in the first bending direction Z, the first partial stops 6' are pressed against the second partial stops 7' and the restraining device 1 has a reinforcing effect. When the support bar 5 is subjected to bending stress in the second bending direction −Z, on the other hand, the first partial stops 6' move away from the second partial stops 7' and the second restraining member 2B rotates about the pivot point 3 and thus changes its angular position relative to the first restraining member 2A, while the support bar 5 is deflected in the second bending direction Z is deflected. The restraining device 1 has no reinforcing effect in this case.

FIG. 5*a* shows a further embodiment of the ear lifter according to the invention in a side view. FIG. 5*b* shows the middle portion 11 of the support bar 5 as a detail in an enlarged view. In FIG. 5*c*, a further detail is shown individually. In the embodiment shown, the restraining device 1 has a plurality of restraining members 2 which are not directly connected to one another. Each one of the restraining members 2 is connected to the middle portion 11 of the support bar 5 by a fastener 18. In FIG. 5*c*, a single one of the restraining members 2 is shown in a perspective view. It has a bore 21 for receiving the fastener 18. The first partial stops 6' are each arranged on one side of the cuboid restraining member 2, while the respective second partial stops 7' are formed on the surface opposite the first partial stop 6'. Thus, a first partial stop 6' and a second partial stop 7' are always in contact with each other between two adjacent restraining members 2. In the embodiment shown, one of the restraining members 2 carries the retainer 14 for receiving the guard (not shown). The restraining members are not directly connected to one another, but are indirectly connected via the support bar 5. Under a bending stress on the support bar 5 in the first bending direction Z, the first partial stops 6' are pressed against the second partial stops 7' and the restraining members 2 together form the stiffening restraining device 1. In contrast, under a bending stress in the opposite second bending direction −Z, the first partial stops 6' move away from the second partial stops 7' and the individual restraining members 2 have no influence on the bending properties of the support bar 5.

FIG. 6*a* shows a further embodiment of the ear lifter according to the invention in a side view. FIG. 6*b* shows the middle portion 11 of the support bar 5 as a detail in an enlarged perspective view. FIG. 6*c* shows a perspective view of the restraining device alone and in individual parts. FIGS. 6*a*, 6*b* and 6*c* are described together. As can be seen most distinctly in FIG. 6*c*, the restraining device is formed of three separate, unconnected individual parts, namely the first restraining member 2A, the pivot point 3 and the second restraining member 2B. The first restraining member 2A comprises the first front end 8 of the restraining device 1, which is connected to the middle portion 11 of the support bar 5 by fasteners 18. The second restraining member 2B, comprising the second rear end 9 of the restraining device 1, is also connected to the center portion 11 of the support bar 5 by fastener means 18. Furthermore, retainer 14 is arranged on the second restraining member 2B. The restraining device forms a pivot joint, wherein the pivot point 3 is in the form of a circular disc arranged in corresponding semicircular formations of the first restraining member 2A and the second restraining member 2B. The first restraining member 2A is thus angularly displaceable relative to the second restraining member 2B via the pivot point 3. The plate-shaped parts of the first restraining member 2A and the second restraining member 2B forming the joint, as well as the pivot point 3, have their major directions of extension in a plane spanned by the first bending direction Z and the major direction of extension X. The support bar extending perpendicularly thereto has the slot-like recess 4 through which the first restraining member 2A, the second restraining member 2B and the pivot point each extend partially. The pivot point 3 has a shoulder forming the first partial stop 6'. This shoulder extends in a straight line approximately through the center of the pivot point. As a result, a semicircular part of the disk forming the pivot point 3 has a greater thickness in the secondary direction of extension Y than the second, likewise approximately semicircular half of this disk. The shoulder forming the first partial stop 6' is preferably formed on both sides of the pivot point, so that the pivot point has two first partial stops 6'. As can be seen in particular from FIGS. 6a and 6b, the partial stops 6', which are formed as a shoulder at the pivot point 3, are in contact with the support bar 5, so that the corresponding second partial stops 7' are formed on the support bar 5. Under a bending load on the support bar 5 in the first bending direction Z, the first restraining member 2A cannot be rotated about the pivot point relative to the second restraining member 2B, since both the first restraining member 2A and the second restraining member 2B are connected to the support bar 5. To allow such angular displacement, the pivot point 3 with the plate-shaped components of the first restraining member 2A and the second restraining member 2B would have to move further through the slot-shaped recess 4. However, this is prevented by the first stops 6' at the pivot point, since the shoulders forming the first partial stops 6' abut the support bar 5 at the pivot point and thus prevent the pivot point from moving further through the recess 4. For this reason, the restraining device 1 has a reinforcing effect against a bending moment in the first bending direction Z. On the other hand, when the support bar 5 is subjected to a bending stress in the second bending direction −Z, the first restraining member 2A can be displaced relative to the second restraining member 2B around the pivot point 3, as the pivot point 3 moves downwardly out of the recess 4 in the direction of the first bending direction Z. In doing so, the first partial stops 6' on the pivot point 3 move away from the second partial stops 7' on the support bar 5, so that the restraining device 1 does not significantly affect the deflection of the support bar 5 in the second bending direction −Z. In FIG. 6c, the surfaces of the semicircular recesses on the first restraining member 2A and on the second restraining member 2B are further designated as first partial stops 6'. These interact with the lateral surface of the disk-shaped pivot point 3 as the second partial stop 7'.

FIG. 7a shows a further embodiment of the ear lifter according to the invention in perspective view. FIG. 7b shows the embodiment enlarged as a detail in a side view. FIGS. 7c and 7d show the detail enlarged in further perspective views. In the following, FIGS. 7a, 7b, 7c and 7d will be described together. The restraining device 1 is attached to the support bar 5 by the first end 8. A guide element 22 of the restraining device 1 is guided in a slot-like recess 4 of the support bar 5. The first stop 6 on the restraining device 1 is formed on its upper side facing the support bar 5 in the vicinity of the second end 9, and rests against the second stop 7 on the support bar 5. In the exemplary embodiment, the second stop 7 is formed by a fastener 18 with which the retainer 14 is fastened to the upper side of the support bar 5. The fastener 18 is, for example, a rivet head. When the support bar 5 is subjected to bending stress in the first bending direction Z, the first stop 6 rests against the second stop 7. The second end 9 is pressed upwards against the fastener 18. Thus, the restraining device 1 has a reinforcing effect. Under a bending stress in the second bending direction −Z of the support bar 5, the first stop 6 moves away from the second stop 7, since the second end 9 is not connected to the support bar 5. The restraining device 1 thus has the effect of a reduced reinforcement of the support bar 5 with respect to the bending stress in the second bending direction −Z.

FIG. 8a shows a further embodiment of the ear lifter according to the invention in a side view. FIG. 8b shows the middle portion 11 of the support bar 5 as a detail in an enlarged perspective view. In FIG. 8c, the restraining device 1 alone is shown in its discrete parts as a detail in perspective. In the embodiment shown, the restraining device 1 is designed as a plate-shaped member with its major directions of extension lying in a plane spanned by the major direction of extension X and the secondary direction of extension Y. The plate-shaped restraining device is thus arranged parallel to the support bar 5. The first end 8 of the restraining device 1 is connected to the support bar 5 by fasteners 18. The second end 9 of the restraining device 1 is not connected to the support bar 5. In FIG. 8c, it can be seen that the restraining device 1 has a hole 21 at its first end 8 for receiving the fasteners 18. About halfway along the length of the restraining device 1 as seen in the major direction of extension X, there is a bend so that the rear part of the restraining device 1 with the second end 9 protrudes from the support bar 5 by about one plate thickness of the restraining device, while the front part of the restraining device 1 with the first end 8 rests directly against the support bar 5. The rear part with the second end 9 of the restraining device 1 has a receiving opening 23, which serves to receive an insert 24. The insert 24 comprises a plate-shaped component which is arranged parallel to the rear part of the restraining device 1 with the second end 9, so that this plate-shaped component of the insert 24 lies between the rear part of the restraining device 1 and the support bar 5. Two guide elements 22 extend from the plate-shaped component of the insert 24 approximately perpendicularly thereto, so that they surround the support bar 5 on both sides. The two guide elements 22 surrounding the support bar 5 on the outside perform the same function as the guide elements in other embodiments, which are guided through a slot-like recess in the support bar, namely to prevent lateral deflection in the secondary direction of extension Y of the restraining device 1. Furthermore, the retainer 14 for receiving the guard is arranged on the insert 24. The retainer 14 corresponds in shape to the receiving opening 23, so that the retainer 14 can be inserted into the receiving opening 23 and is arranged on the side of the restraining device 1 opposite the support bar 5 when the restraining device 1 is mounted.

The plate-shaped member of the insert 24 has the first stop 6 on its side facing the support bar 5. Accordingly, the side of the support bar facing the restraining device 1 forms the second stop 7. When bending stress is applied to the support bar 5 in the first bending direction Z, the first stop rests against the second stop, so that the restraining device 1 acts as a reinforcement of the support bar 5 in the middle portion 11. When the support bar 5 is subjected to a bending load in the second bending direction −Z, the restraining device 1 is not bent as well, since the first stop 6 moves away from the second stop 7, for which in turn the retainer 14 must have a corresponding clearance on the finger guard. The deflection of the support bar in the second bending direction −Z is not significantly influenced by the restraining device 1.

FIG. 9a shows a further embodiment of the ear lifter according to the invention in a side view. FIG. 9b shows the middle portion 11 of the support bar 5 as a detail in an enlarged perspective view. In the embodiment shown, the restraining device 1 differs from the embodiment according to FIG. 8a in that it is formed in one piece. Furthermore, the restraining device 1 has a guide element 22, which is guided in a slot-like recess 4. The first end 8 of the restraining device 1 is connected to the support bar. The restraining device 1 is substantially formed by a plate-shaped member extending substantially in a plane spanned by the first bending direction Z and the major direction of extension X. This plate-shaped member of the restraining device is thus oriented perpendicular to the support bar 5. The second end 9 of the restraining device 1 is formed by the retainer 14, the upper side of which facing the support bar 5 forms the first stop. The lower side of the support bar 5 facing the retainer 14 thus forms the second stop 7. When the support bar 5 is subjected to bending stress in the first bending direction Z, the first stop 6 bears against the second stop 7, so that the restraining device 1 is effective as a reinforcement of the support bar 5 in the middle portion 11. In contrast, when the support bar 5 is subjected to bending stress in the second bending direction −Z, the second end 9 of the restraining device 1, which is not connected to the support bar 5, moves away from the support bar 5, so that the first stop 6 no longer bears against the second stop 7. The restraining device 1 thus has no significant influence on the bending properties of the support bar 5 in the second bending direction −Z.

FIG. 10a shows a side view of a variation of the embodiment according to FIG. 2a, which is only distinguished by its shape. FIG. 10b shows the middle portion 11 of the support bar 5 as a detail in an enlarged perspective view. Otherwise, reference is made to the description of FIGS. 2a, 2b and 2c, since the embodiment shown there is functionally identical.

FIG. 11a shows a side view of a variation of the embodiment shown in FIG. 9a which relates to the design only. FIG. 11b shows the middle portion 11 of the support bar 5 as a detail in an enlarged perspective view. In FIG. 11c, the restraining device 1 alone is shown as a detail in perspective. In FIG. 11c, it can be seen that the retainer 14 is connected to the guide element 22 or is formed in one piece, so that the retainer 14 and the guide element 22 with the first end 8 provided for attachment form the restraining device 1. With regard to the functional context, reference is made to the description of FIGS. 9a, 9b and 9c.

FIG. 12a shows a further embodiment of the ear lifter according to the invention in a side view. FIG. 12b shows the middle portion 11 of the support bar 5 as a detail in an enlarged perspective view. In the exemplary embodiment shown, the restraining device 1 is made of several parts. The restraining device 1 comprises the first restraining member 2A, the second restraining member 2B and a pivot point 3. The first restraining member with the first end 8 of the restraining device 1 is attached to the support bar 5 by fasteners 18. Similarly, the second restraining member 2B with the second end 9 of the restraining device 1 is connected to the support bar 5 by a fastener 18. The retainer 14 for the restraining member is formed on the second restraining member 2B. The first restraining member 2A, the second restraining member 2B and the pivot point 3 form a pivot joint. For this purpose, the first restraining member 2A and the second restraining member 2B have plate-shaped parts, which have a cutout in which the pivot point 3 is accommodated. The pivot point 3 is also plate-shaped, wherein the major directions of extension of the plate-shaped parts of the first restraining member 2A and the second restraining member 2B, as well as the pivot point 3, are arranged in a plane spanned by the major direction of extension X and the first bending direction Z. The described components of the restraining device 1 are thus aligned perpendicular to the support bar 5 and extend through the recess 4 of the support bar 5. The plate-shaped parts of the first restraining member 2A and the second restraining member 2B thus also form the guide elements 22. In the exemplary embodiment shown, the pivot point 3 does not have a circular shape. Rather, in the portion below the support bar 5, approximately rectilinear edge regions of the pivot point 3 are provided, which form the second partial stops 7' at the pivot point 3. The first restraining member 2A and the second restraining member 2B are shaped accordingly and, in the edge region facing the pivot point 3, correspondingly form the first partial stops 6'. The portion of the pivot point 3 projecting through the recess 4, on the other hand, is semicircular in shape. When the support bar 5 is subjected to bending stress in the first bending direction Z, angular displacement of the first restraining member 2A relative to the second restraining member 2B via the pivot point 3 is impossible, since the first partial stops 6' and second partial stops 7', which extend approximately in a straight line, block the pivot joint. The restraining device 1 attached to the first end 8 and to the second end 9 thus has a reinforcing effect against bending stress on the support bar 5 in the first bending direction Z. When bending stress is applied in the second bending direction −Z, on the other hand, the joint formed by the first restraining member 2A, the second restraining member 2B and the pivot point 3 can move. The first restraining member 2A is angularly displaced relative to the second restraining member 2B about the pivot point 3. In this process, the first partial stops 6' move away from the second partial stops 7', and therefore the rectilinear edge portions of the pivot point are not parallel to each other to prevent the pivot point 3 from getting lost when the support bar 5 is deflected in the second bending direction −Z. The movable pivot of the restraining device 1 has no significant influence on the bending properties of the support bar 5 when subjected to a bending load in the second bending direction −Z.

FIG. 13a shows a further exemplary embodiment of the ear lifter according to the invention in a side view. In FIG. 13b, the middle portion 11 of the support bar 5 is shown as a detail in an enlarged perspective view. In the embodiment, the pivot point 3 has a circular shape. The plate-shaped parts of the first restraining member 2A and the second restraining member 2B each have corresponding formations in the shape of circular segments to accommodate the pivot point 3. Two pins forming the first partial stops 6' are arranged on the plate-shaped parts of the first restraining member 2A and the second restraining member 2B, which rest directly against the support bar 5. The underside of the support bar 5 facing the first partial stops 6' thus forms the second partial stops 7'. Under a bending load on the support bar 5 in the first bending direction Z, the pivot joint formed by the first restraining member 2A, the second restraining member 2B and the pivot point 3 cannot be rotated, since this would require the plate-shaped parts of the first restraining member 2A and the second restraining member 2B, as well as the pivot point 3, to move further up through the recess 4. This is prevented by the first partial stops 6' in the form of pins, which are pressed against the support bar 5 forming the second partial stops 7'. This blocking of the pivot joint causes the restraining device 1 to have a stiffening effect against the bending stress of the support bar 5 in the first bending direction Z. On the other hand, when the support bar is subjected to bending stress in the second bending direction −Z, the pivot joint formed by the first restraining member 2A, the second restraining member 2B and the pivot point 3 can rotate, wherein the plate-shaped parts of the first restraining member 2A and the second restraining member 2B, as well as the pivot point 3, are thereby moved slightly downwards out of the recess 4 of the support bar 5, so that the first partial stops 6' are moved away from the second partial stops 7'. The first restraining member 2A can thus be angularly displaced relative to the second restraining member 2B about the pivot point 2. The restraining device 1 thus has no influence on the bending properties of the support bar 5 when subjected to bending stress in the second bending direction −Z.

FIG. 14a shows a further embodiment of the ear lifter according to the invention in a side view. In FIG. 14b, the middle portion 11 of the support bar 5 is shown in a perspective view. The restraining device 1 is connected to the support bar 5 at its front end 8 by means of two fasteners 18. In the exemplary embodiment shown, the restraining device 1 is formed in two parts and comprises a first restraining member 2A and a second restraining member 2B. The attached front end 8 is arranged on the first restraining member 2A. In the exemplary embodiment, the second end 9 of the restraining device is also connected to the support bar 5 by a fastener 18. The second end 9 is located at the second restraining member 2B and is formed by the retainer 14 for receiving a guard. The support bar 5 has a slot-shaped recess 4 in which a guide element 22 of the restraining device is guided. The first restraining member 2A is connected to the second restraining member 2B via a pivot point 3, which also extends through the recess 4. The pivot point 3 is in particular a circular disc, which is separated from the first restraining member 2A and from the second restraining member 2B by a slot 19. Thus, the pivot point 3 works in the manner of a hinge. The pivot point 3 is not connected to the first restraining member 2A. The pivot point 3 is connected to the second restraining member 2B via a connection 20, since the slot 19 does not extend into the region of the connection 20. In the illustrated embodiment, there are again a plurality of first and second stops which act together to allow reinforcement of the support bar 5 by the restraining device 1 under bending stress in the first bending direction Z, but not in the opposite second bending direction −Z. The plurality of spatially separated stops are designated, as previously, as first partial stops 6' and second partial stops 7'. The first partial stops 6' are arranged in the area of the slot 19, namely at the first restraining member 2A and at the pivot point 3. The first partial stops 6' abut respectively against second partial stops 7', which are thus also arranged in the area of the slot 19, namely accordingly at the pivot point 3 and at the second restraining member 2B. When bending stress is applied to the support bar 5 in the first bending direction Z, the first partial stops 6' are pressed against the second partial stops 7' and the restraining device 1 has a reinforcing effect. In contrast, when the support bar 5 is subjected to bending stress in the second bending direction −Z, the first partial stops 6' move away from the second partial stops 7' and the second restraining member 2B rotates about the pivot point 3 and thus changes its angular position relative to the first restraining member 2A, while the support bar 5 is deflected in the second bending direction −Z. The restraining device 1 then has no or a much smaller reinforcing effect.

FIG. 15a shows a further embodiment of the ear lifter according to the invention in a side view. FIG. 15b shows the middle portion 11 of the support bar 5 as a detail in an enlarged perspective view. In FIG. 15c, the restraining device 1 is shown alone and in separate parts in a perspective view. FIGS. 15a, 15b and 15c will be described together. As can be seen most distinctly in FIG. 15c, the restraining device 1 is formed in four single unconnected parts, namely the first restraining member 2A, the two-part pivot point 3 and the second restraining member 2B. The first restraining member 2A comprises the first front end 8 of the restraining device 1, which is connected to the middle portion 11 of the support bar 5 by fasteners 18. The second restraining member 2B, comprising the second rear end 9 of the restraining device 1, is also connected to the center portion 11 of the support bar 5 by fastener means 18. Furthermore, the retainer 14 is arranged on the second restraining member 2B. The two-part pivot point 3 is shown twice in FIG. 15c, on the one hand together with the restraining members 2A and 2B as the restraining device 1, and on the other hand once disassembled into its two parts, which are designated as the first pivot point part 3' and the second pivot point part 3". Both pivot point parts 3', 3" together form the substantially circular pivot point 3. Both pivot point parts 3', 3" have an edge bead 25, each extending along a partial circumference of the edge. In the section of the edge bead 25, the pivot point 3 has a greater thickness than in its disc-shaped central area 26 surrounded by the edge bead 25. Furthermore, the edge bead 25 projects radially beyond the disc-shaped central area 26. The restraining device 1 forms a pivot joint, wherein the disc-shaped central area 26 of the pivot point 3 is fitted into the corresponding semi-circular formations of the first restraining member 2A and the second restraining member 2B. In the assembled state, the projecting edge bead 25 thus covers the gap formed between the restraining members 2A, 2B and the central area 26 of the pivot point 3, advantageously preventing dirt or cut stalks from entering the gap. Further advantageously, the edge bead 25 forms a lateral guide for the pivot point 3 along the restraining members 2A, 2B, with which the edge bead 25 positively connects the pivot point 3 in the secondary direction of extension Y.

The first restraining member 2A is angularly displaceable relative to the second restraining member 2B via the pivot point 3. The plate-shaped parts of the first restraining member 2A and the second restraining member 2B forming the joint, as well as the central area 26 of the pivot point 3, have their major directions of extension in a plane spanned by the first bending direction Z and the major direction of extension X. The support bar 5 extending perpendicularly thereto comprises the slot-like recess 4 through which the first restraining member 2A, the second restraining member 2B and the central area 26 of the pivot point 3 each extend partially. The edge bead 25, on the other hand, extends in the secondary direction of extension Y such that it projects beyond the recess 4 and abuts the support bar 5. For mounting the pivot point 3, it is formed in two parts in the shown embodiment.

The first stop 6 of the restraining device 1 is divided into six first partial stops 6' in the exemplary embodiment. The second stop 7 is likewise divided into a plurality of second partial stops 7', wherein the respective first partial stops 6' cooperate with the second partial stops 7' to block the relative movement of the restraining device 1 with respect to the middle portion 11 under bending stress in the first bending direction Z. The pivot point 3 comprises four of the first partial stops 6', and a further first partial stop 6' is located on each of the first restraining member 2A and the second restraining member 2B. The corresponding second partial stops 7' are formed at the edge of the disk-shaped central area 26 of the pivot point 3, which abuts the first restraining member 2A and the second restraining member 2B. The first partial stops 6' on the pivot point 3 are formed by two cap ends of the edge bead 25 on each side of the first pivot point portion 3'. The edge bead 25 extends along a partial circumference of the edge of the first pivot part 3' and ends in each case with a cap end at a distance from the diameter line of the disc-shaped central region 26, wherein all four cap ends bear as first partial stops 6' against the underside of the support bar 5, on which the associated second partial stops 7' are formed. Under a bending stress of the support bar 5 in the first bending direction Z, the first restraining member 2A cannot be rotated relative to the second restraining member 2B about the pivot point 3, since both the first restraining member 2A and the second restraining member 2B are connected to the support bar 5. To allow such angular displacement, the pivot point 3 with the plate-shaped parts of the first restraining member 2A and the second restraining member 2B would have to move further through the slot-shaped recess 4. However, this is prevented by the first partial stops 6' on the pivot point 3, since the cap ends of the edge bead 25 forming the first partial stops 6' on the first pivot point portion 3' abut the support bar 5 and thus prevent the pivot point 3 from moving further through the recess 4. For this reason, the restraining device 1 is effective to reinforce against a bending moment in the first bending direction Z. The edge bead 25 on the second pivot part 3" extends over a smaller partial circumference of the edge than in the case of the first pivot part 3'. When the support bar 5 is subjected to a bending load in the second bending direction -Z, the first restraining member 2A can thereby be displaced relative to the second restraining member 2B about the pivot point 3, as the pivot point 3 moves downwardly out of the recess 4 in the direction of the first bending direction Z. As it does so, the first partial stops 6' move away from the second partial stops 7', so that the restraining device 1 does not substantially affect the deflection of the support bar 5 in the second bending direction -Z. The surfaces of the semi-circular recesses on the first restraining member 2A and on the second restraining member 2B, which form first partial stops 6' and are not shown here, are comparable to those of the embodiment shown in FIG. 6c.

FIG. 16a shows a further embodiment of the ear lifter according to the invention in a perspective view. FIG. 16b shows the middle portion 11 of the support bar 5 as a detail in an enlarged side view. FIGS. 16c and 16d show the middle portion 11 of the support bar 5 as a detail in two different perspective views. FIGS. 16a, 16b, 16c and 16d are described together. In an embodiment, the restraining device 1 comprises a tension element 28. The restraining device 1 is attached to the middle portion 11 of the support bar 5 with the first end 8 by means of rivets as fasteners 18. The second end 9 of the restraining device 1 is fastened to the support bar 5 by means of a rivet as fastener 18. The center section 11 has a shaped portion 11', which in the broadest sense can be described as U-shaped, wherein the tension element 28 spans the shaped portion 11'. The tension element 28 can be designed as a wire; in the exemplary embodiment shown, it is a spring sheet. The tension element 28 is subjected to tensile stress under the bending stress in the first bending direction Z and thereby has a reinforcing effect with respect to a bending stress of the middle portion 11. The reinforcing effect of the tension element 28 is greater with respect to the bending stress of the middle portion 11 in the first bending direction Z than in the second bending direction -Z, since the tensile forces that can be transmitted via the tension element 28 are greater than the compressive forces that the spring sheet can absorb as tension element 28. If compressive forces are introduced into the tension element 28 via the fastened ends 8, 9, which is the case with bending stress in the second bending direction -Z, the spring sheet is bent and has only a slight or no reinforcing effect, so that the support bar 5 can be flexibly bent upwards. In addition, as can be seen in FIGS. 16c and 16d, the fastening of the second end of the restraining device 1 can be effected through an elongated hole 27 in the tension element 28. As a result, initially the tension element 28 cannot absorb any compressive forces, practically, when bending stress is applied in the second bending direction -Z, since the middle portion 11 with the fastener 18 can shift along the elongated hole 27 of the restraining device 1. The spring sheet as tensioning means 28 is only compressed when the fastener 18 abuts the distal end of the elongated hole 27 under pressure.

FIG. 17a shows a further embodiment of the ear lifter according to the invention in a perspective view. FIG. 17b shows the middle portion 11 of the support bar 5 as a detail in an enlarged side view. FIGS. 17c and 17d show the middle portion 11 of the support bar 5 as a detail in two different perspective views. FIGS. 17a, 17b, 17c and 17d are described together. In the embodiment, the restraining device 1 has a pressure element 29. The pressure element 29 of the restraining device 1 is attached to the middle portion 11 of the support bar 5 with the first end 8 by means of rivets as fasteners 18. The second end 9 of the pressure element 29 of the restraining device 1 is not connected to the support bar 5. The middle portion 11 has a shaped portion 11' which can be described in the broadest sense as being U-shaped, wherein the pressure element 28 bears with the second end 9 against the shaped portion 11', so that the first stop 6 is formed at the second end 9 and the second stop 7 is formed at the shaped portion 11' of the middle portion 11. Under the bending stress in the first bending direction Z, the first stop 6 is pressed against the second stop 7 and the pressure element 29 is subjected to pressure, so that it thereby has a reinforcing effect with respect to the bending stress of the middle portion 11 in the first bending direction Z. The reinforcing effect of the pressure element 29 is greater with respect to the bending stress of the middle portion 11 in the first bending direction Z, since the pressure element 29 can only absorb compressive forces, since the second end 9 is not attached to the support bar 5. When the middle portion 11 is subjected to bending stress in the second bending direction -Z, it is therefore free to move. In addition, the restraining device 1 may comprise a tension element 28, which is best seen in FIG. 17D. In the case, the restraining device 1 comprises two parts, wherein the tension element 28 and the pressure element 29 in the case each have a first end 8 and a second end 9. In all other respects, reference is made to the description of the exemplary embodiment according to FIGS. 16a, 16b, 16c and 16d with respect to the details of the function of the tension element 28.

REFERENCE NUMERALS

1 Restraining device
2 Restraining members
2A First restraining member
2B Second restraining member
3 Pivot point
3' First pivot part
3" Second pivot part
4 Recess
5 Support bar
6 First stop 6' First partial stop
7 Second stop
7 Second partial stops
8 First end of the restraining device
9 Second end of restraining device
10 Fastening portion
11 Middle portion
11' Shaped portion of the middle portion
12 Skid portion
14 Retainer
15 Guard
16 Stalk lifter
17 Front end, tip
18 Fastener
19 Slot
20 Connection
21 Hole
22 Guide element
23 Insertion opening
24 Insert
25 Edge bead
26 Disc-shaped central area
27 Oblong hole
28 Tension element
29 Compression element
X Major direction of extension
Y Secondary direction of extension
Z First bending direction
−Z Second bending direction

The invention claimed is:

1. An ear lifter for crops with a support bar, wherein the support bar extends in a main direction of extension and has, arranged one after the other in the main direction of extension, a fastening portion, a middle portion and a skid portion, wherein the support bar has a restraining device extending along the middle portion,
wherein the restraining device reinforces the middle portion with respect to a bending stress, wherein a stiffening effect of the restraining device is greater in a first bending direction than in a second bending direction opposite to the first bending direction,
wherein the restraining device includes a stiffening plate extending substantially parallel to the middle portion of the support bar, the stiffening plate having a first end rigidly fixed to the middle portion of the support bar and a second, opposite end having a first stop which engages a second stop provided on the support bar to restrict relative movement of the support bar to a greater degree in the first bending direction than in the second bending direction.

2. The ear lifter for crops according to claim 1, wherein the restraining device is formed in multiple parts with at least two restraining members.

3. The ear lifter for crops according to claim 2, wherein each restraining member is connected at the middle portion to the support bar.

4. The ear lifter for crops according to claim 1, wherein the first stop is divided into at least two first partial stops and the second stop is divided into at least two second partial stops, wherein the respective first partial stops engage with the respective second partial stops to block the relative movement under the bending stress in the first bending direction.

5. The ear lifter for crops according to claim 2, wherein the restraining members are arranged angularly displaceable relative to each other about an axis perpendicular to the major direction of extension, wherein an angular displacement in the first bending direction is blocked by the restraining members and is free in the second bending direction.

6. The ear lifter for crops according to claim 2, wherein the restraining device comprises a first restraining member and a second restraining member, wherein the first restraining member is connected to the second restraining member via a pivot point.

7. The ear lifter for crops according to claim 6, wherein the first stop is arranged at the pivot point.

8. The ear lifter for crops according to claim 7, wherein the first stop is divided into at least two first partial stops and the second stop is divided into at least two second partial stops, wherein the respective first partial stops engage with the respective second partial stops to block the relative movement under the bending stress in the first bending direction, and
wherein one of the first partial stops is arranged on the first restraining member and another of the first partial stops is arranged on the second restraining member, wherein the second partial stops are arranged on the support bar or on the pivot point.

9. The ear lifter for crops according to claim 1, wherein the support bar has a recess in the middle portion, wherein at least a portion of the restraining device extends through the recess, wherein the second stop is in particular formed at the recess.

10. The ear lifter for crops according to claim 1, wherein a retainer is provided, wherein the retainer is arranged on the support bar to provide abutment against a mowing finger, wherein the retainer is formed on the restraining device.

11. The ear lifter for crops according to claim 1, wherein the fastening portion is fixedly secured to a mower bar.

* * * * *